(12) United States Patent
Soave et al.

(10) Patent No.: US 11,635,139 B2
(45) Date of Patent: Apr. 25, 2023

(54) PLUNGER LOCK MECHANISM SUCH AS FOR RESTRICTING SHIFTER MOTION

(71) Applicant: Kuster North America, Inc., Troy, MI (US)

(72) Inventors: Christopher Soave, Oxford, MI (US); Brian Andrew Mayville, Northville, MI (US)

(73) Assignee: Kuster North America, Inc., Troy, MI (US)

( * ) Notice: Subject to any disclaimer, the term of this patent is extended or adjusted under 35 U.S.C. 154(b) by 0 days.

(21) Appl. No.: 17/683,466

(22) Filed: Mar. 1, 2022

(65) Prior Publication Data
US 2022/0307591 A1    Sep. 29, 2022

Related U.S. Application Data

(60) Provisional application No. 63/167,225, filed on Mar. 29, 2021.

(51) Int. Cl.
*F16H 61/22* (2006.01)
*F16H 59/10* (2006.01)
(Continued)

(52) U.S. Cl.
CPC ............. *F16H 61/22* (2013.01); *F16H 59/10* (2013.01); *F16H 63/304* (2013.01);
(Continued)

(58) Field of Classification Search
CPC ......... F16H 2059/026; F16H 2061/243; F16H 2061/2869; F16H 2061/223; F16H 59/105;
(Continued)

(56) References Cited

U.S. PATENT DOCUMENTS 6,179,316 B1    1/2001   Sibley, Jr.
7,832,302 B2 *  11/2010  Wang ...................... G05G 5/24
                                                         74/473.23
(Continued)

FOREIGN PATENT DOCUMENTS

CN          108730499 A     11/2018
KR     10-2011-0006923 A     1/2011
(Continued)

OTHER PUBLICATIONS

International Search Report and Written Opinion for PCT Application No. PCT/US2022/023576 dated Jul. 27, 2022, 9 pages.
(Continued)

*Primary Examiner* — Jake Cook
*Assistant Examiner* — Gregory T Prather
(74) *Attorney, Agent, or Firm* — Dinsmore & Shohl LLP

(57) ABSTRACT

A plunger lock mechanism including a housing containing a rotationally supported lever shaped component, the component including at least one notch or recess configured within an arcuate surface. An electric motor is configured to rotate a cam extending within the housing, the cam actuating at least one plunger having an extending portion aligning with a selected notch. Upon rotation of the cam by the motor, the plunger is caused to displace between either of engaged and disengaged positions with the component such that, when disengaged, permitting rotation of the component.

18 Claims, 17 Drawing Sheets

(51) Int. Cl.
*F16H 63/34* (2006.01)
*F16H 63/30* (2006.01)

(52) U.S. Cl.
CPC ... *F16H 63/3466* (2013.01); *F16H 2061/223* (2013.01); *F16H 2063/3056* (2013.01); *F16H 2063/3066* (2013.01)

(58) Field of Classification Search
CPC .......... F16H 59/10; F16H 61/22; F16H 63/38; F16H 63/304; F16H 63/3466; F16H 2063/3056; F16H 2063/3066
See application file for complete search history.

(56) References Cited

U.S. PATENT DOCUMENTS

| | | |
|---|---|---|
| 9,242,623 B2 | 1/2016 | Burgardt et al. |
| 9,334,949 B2 | 5/2016 | Fett et al. |
| 9,649,932 B2 | 5/2017 | Vermeersch et al. |
| 10,088,040 B2 | 10/2018 | Mitteer et al. |
| 10,378,237 B2 | 8/2019 | Bacon et al. |
| 10,677,344 B2 | 6/2020 | Wang et al. |
| 10,935,132 B2 | 3/2021 | Kwon et al. |
| 11,193,579 B2 | 12/2021 | Twa et al. |
| 2002/0121784 A1 | 9/2002 | Chevalier |
| 2004/0226801 A1 | 11/2004 | De Jonge et al. |
| 2006/0016287 A1 | 1/2006 | Grossman et al. |
| 2009/0217782 A1 | 9/2009 | Wang |
| 2014/0007729 A1* | 1/2014 | Fredriksson ........ F16H 59/0204 74/473.21 |
| 2015/0114157 A1* | 4/2015 | TenBrink ................ F16H 59/10 74/473.12 |
| 2015/0285351 A1* | 10/2015 | Rake ...................... F16H 27/06 74/436 |
| 2017/0074391 A1* | 3/2017 | Tebbe ..................... F16H 61/22 |
| 2017/0114892 A1 | 4/2017 | Abe |
| 2017/0219095 A1 | 8/2017 | Beattie et al. |
| 2017/0356543 A1* | 12/2017 | Turney .................. F16H 59/105 |
| 2018/0172140 A1* | 6/2018 | Liubakka ................ B60K 20/02 |
| 2018/0283543 A1* | 10/2018 | Cha ......................... F16H 61/24 |
| 2018/0320780 A1 | 11/2018 | Heo et al. |
| 2020/0149626 A1 | 5/2020 | Nakagawa |
| 2020/0166123 A1* | 5/2020 | Bagley ..................... F16H 59/08 |
| 2020/0240183 A1 | 7/2020 | Bacon |
| 2021/0172512 A1 | 6/2021 | Soave et al. |

FOREIGN PATENT DOCUMENTS

| | | |
|---|---|---|
| WO | 9840648 A1 | 9/1998 |
| WO | 2008006021 A2 | 1/2008 |

OTHER PUBLICATIONS

International Search Report and Written Opinion for PCT Application No. PCT/US2022/020678 dated Jun. 30, 2022, 10 pages.

* cited by examiner

PLUNGER LOCK MECHANISM SUCH AS FOR RESTRICTING SHIFTER MOTION

CROSS REFERENCE TO RELATED APPLICATIONS

The present application claims the priority of U.S. Ser. No. 63/167,225 filed Mar. 29, 2021.

FIELD OF THE INVENTION

The present invention relates generally to lock arms or plungers, such as which are associated by non-limiting example with vehicle shifter assemblies. More specifically, the present invention discloses a lock mechanism incorporating an electric motor for rotating a cam component in communication with a spring loaded and displaceable plunger or lock arm. The plunger or lock arm is normally spring biased into a locked or engagement position with a shift lever or other independently rotatable component. Actuated rotation of the cam in turn counter-biases one or more plungers or lock arms in a retracting or disengaging direction from an engaged location with the shift lever or other independently rotatable component in order to unlock the component.

BACKGROUND OF THE INVENTION

Current locking mechanisms incorporate a solenoid or a motor. An example of this is depicted in the auto return to park rotary shifter of U.S. Pat. No. 10,677,344 to Kuster and which includes a solenoid 92 including an extending portion 98 which engages a recessed annular location 94 of a rotatable stopper disk 90. The solenoid can be energized in order to retract the linear portion 98 out of engagement with the stopper disk.

Shortcomings of conventional solenoid locking mechanisms include the large size and cost requirements in order to provide proper response time and travel at all temperature and supply voltage ranges. Additionally, solenoids are only monitored by on or off positions, as well as being limited as to load limitations of the solenoid piston, such requiring the use of either additional mechanisms to move the loading to other parts, or by limiting the load against which the solenoid acts. Additionally, existing motor systems drive and position the plunger assemblies but do not have the ability to position multiple pistons.

SUMMARY OF THE PRESENT INVENTION

The present invention discloses a plunger lock mechanism including a housing containing a rotationally supported component, the component including at least one notch or recess configured within an arcuate surface. An electric motor is configured to rotate a cam extending within the housing, the cam actuating at least one plunger having an extending portion aligning with a selected notch. Upon rotation of the cam by the motor, the plunger is caused to displace between either of engaged and disengaged positions with the component such that, when disengaged, permitting rotation of the component.

The housing further includes right and left hand assembleable portions defining a package receiving space therebetween. The electric motor further includes a worm shaft actuating a worm gear, the cam including an extending end in slaved relationship with the bevel gear so that actuation of the motor causes rotation of the cam.

Other features include the rotationally supported component further having a lever style shifter. The at least one plunger further includes each of a first plunger in aligning relationship with Park and Neutral shifter locations and a second plunger in aligning relationship with Reverse and Drive positions associated with the lever shifter. First and second coil springs are further provided for biasing the first and second plungers in an engaged position relative to the shifter. A magnet is supported upon an end of the cam and, in response to rotation relative to a proximity located sensor, detects a position of the cam.

Additional variants include each of a reconfiguration of fore and aft moveable plungers (defined as axially in line with the direction of pivot of the shift lever), as well as a reconfiguration of the plungers to move cross-wise, or cross car, relative to the shifter housing, this further defined as extending in a perpendicular direction relative to the direction of shifting motion of the lever. In a first reconfiguration, the lever style shifter again includes a motor and gear assembly rotates a cam for actuating a pair of locking arms or plungers in fore and aft directions between a spring loaded engaged position with the lever and a retracted/disengaged position for permitting rotation of the shift lever. In a further reconfiguration, the motor and gear assembly rotates a cam for actuating a pair of locking arms or plungers in crosswise extending direction between a spring loaded engaged position with the lever and a retracted/disengaged position for permitting rotation of the shift lever.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE
PREFERRED EMBODIMENTS

With reference to the attached illustrations, the present invention discloses a plunger or lock arm assembly which substitutes for a conventional solenoid locking arrangement, such as in a non-limiting application being applied to a lever style shifter, and in which a motor driven lock cam is provided in combination with one or more spring loaded plungers/lock arms for rotating a cam component to in turn counter-bias the plungers or lock arms in either of a retracting/disengaging or extending/engaging direction from or to the shift lever or other independently rotatable component, and in order to permit rotation of the shift lever or the like. The present assembly also provides the ability to bias multiple lock arms with a single rotatable cam and depending upon the requirements of the given assembly.

Additionally, and while the illustrated variant depicts the plungers spring-loaded into the normally locked position relative to the shift handle recesses (and by which the cam is actuated to counter-bias and retract/disengage the plungers), it is also envisioned and understood that a reverse arrangement can be employed in which the plungers are reverse biased in a disengaged direction relative to the mating locations of the shift lever, and by which the cam component is rotated by the motor to counter-bias the plungers or lock arms into an extending engagement with a seating location configured within the shifter handle or other non-limiting use application in which it is desired to prevent rotation or other actuation given component.

Figure 1:
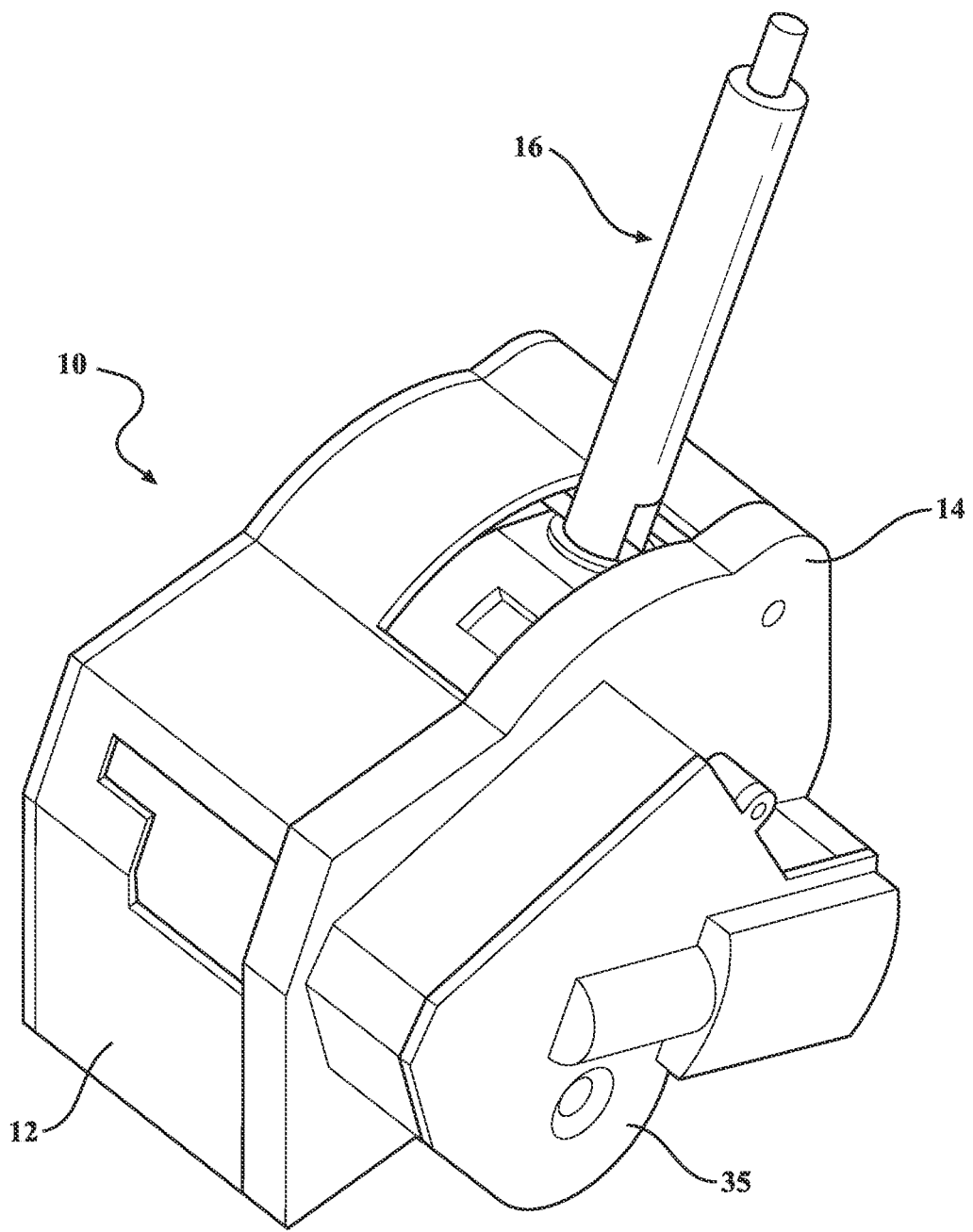
FIG. 1 is an assembled perspective and FIG. 1A an exploded view of a plunger lock mechanism according to a first non-limiting embodiment of the present invention incorporated into a lever style shifter, in which a motor and gear assembly rotates a cam for actuating a pair of locking arms or plungers between a spring loaded engaged position with the lever and a retracted/disengaged position for permitting rotation of the shift lever.
Figure 1A:
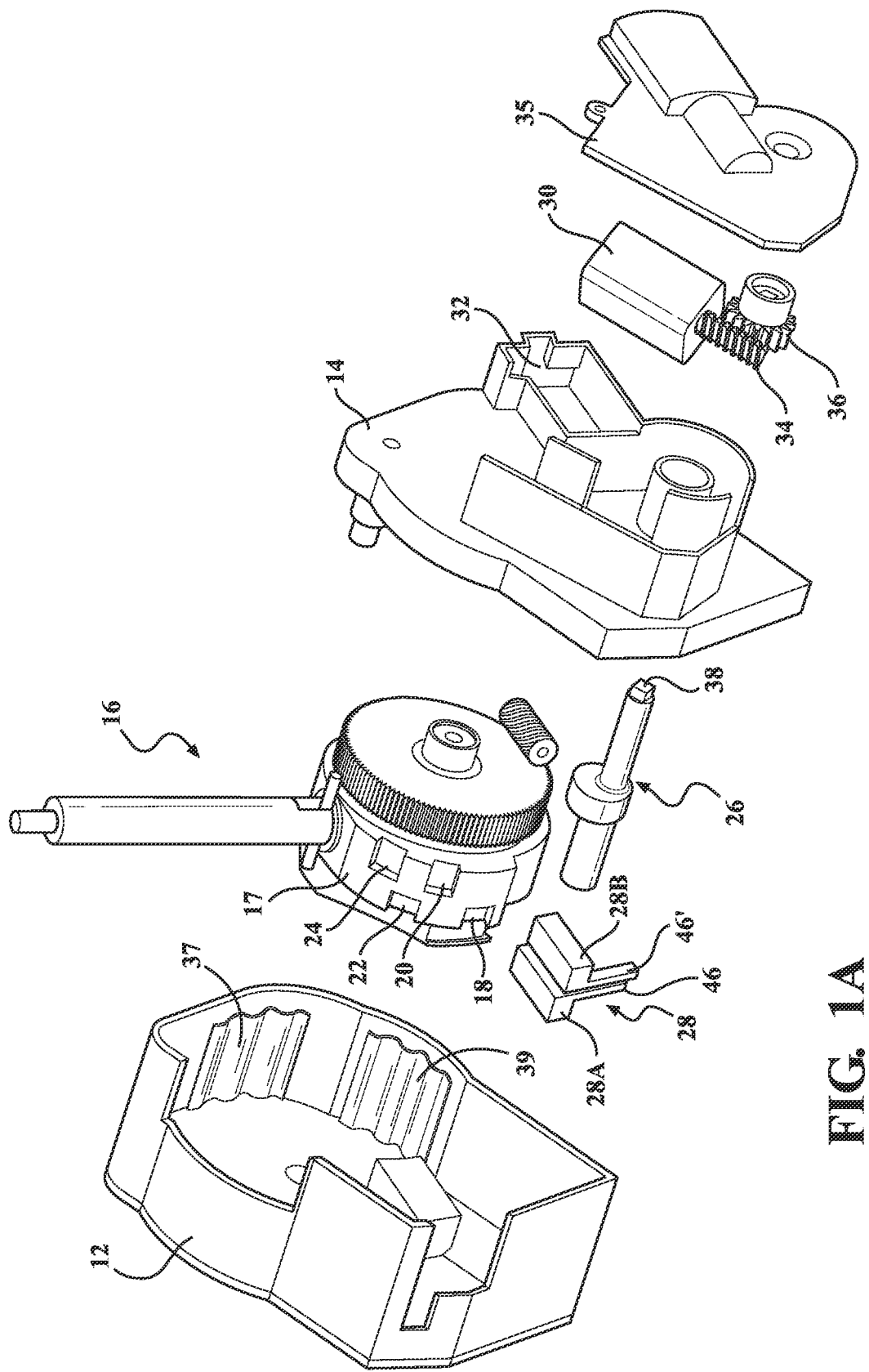

Referring initially to FIGS. 1 and 1A in combination, a pair of assembled and exploded views are provided of a plunger lock mechanism (see generally at 10 in FIG. 1) according to one non-limiting embodiment of the present invention and which is shown incorporated into a lever style shifter assembly. The assembly includes a pair of outer left hand 12 and right hand 14 assemble-able housings, such as constructed from a rigid injection molded plasticized material, between which is defined a package space for receiving a rotationally supported component 16 in the form of an elongated shifter lever which, in the illustrated embodiment, includes a shift lever sub-assembly exhibiting a plurality of recessed notches for engagement by the plungers or lock arms.

The notches are defined in an arcuate surface or base portion 17 of the rotational component 16 from which the elongated lever extends. The base surface includes notches which correspond to each of Park Position (notch 18), Reverse Position (notch 20), Neutral Position (notch 22) and Drive position (notch 24). Reference is also made to rotated perspective of FIG. 8 which better depicts the arrangement of the shift handle recesses.

Also provided in the main package space are accommodations within the left hand 12 and right hand 14 mating housings for locating and supporting each of a motor actuated lock cam component in the form of an elongated stem upon which is exhibited a cam surface 26 for actuating at least one lock arm or plunger 28 (a pair of which being depicted 28A and 28B in further illustrations). An electric motor 30 is provided which seats within a supporting pocket 32 configured in an exterior facing side of the right hand housing 14. A rotatable output worm shaft 34 of the motor 30 actuates a further worm driven gear 36 which is in turn slaved to an extending and keyed end 38 of the lock cam 26 such that rotation of the worm driven gear 36 correspondingly rotates the cam surface 26. Also depicted is a motor cover 35 which assembles over the motor and gear assembly.

Prior to reference to the succeeding illustrations, an overall description of the lock system function includes motor driven cam 26 establishing a position of the lock arms or plungers 28 (such as which are spring loaded into either of a normally engaged or disengaged position relative to the mating recess notches 18, 20, 22 or 24 in the shift lever). As the shift lever 16 is rotated to a given shifter PRND position, a corresponding one of the recess notches is aligned with the plungers.

Figure 4:
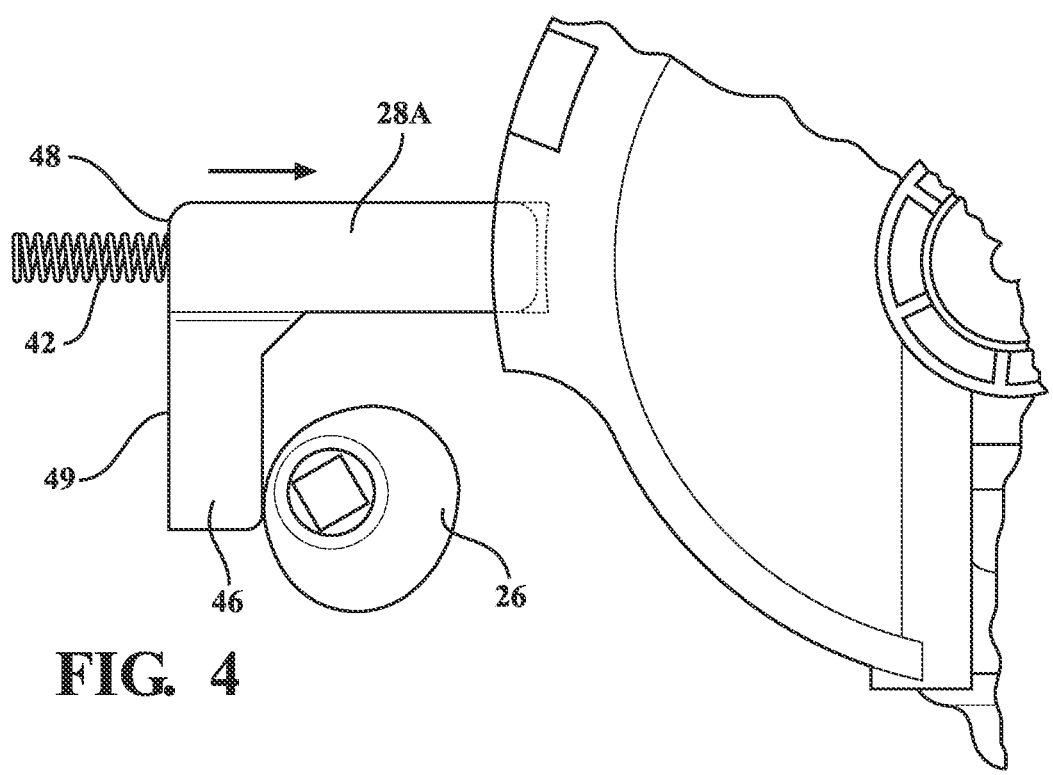
FIG. 4 depicts the interior component of the assembly without the motor and gear, and in order to better show the plungers or lever arms in the locked/engaged position within the mating recesses defined in the shift lever or handle prior to engagement by the cam.
Figure 5:
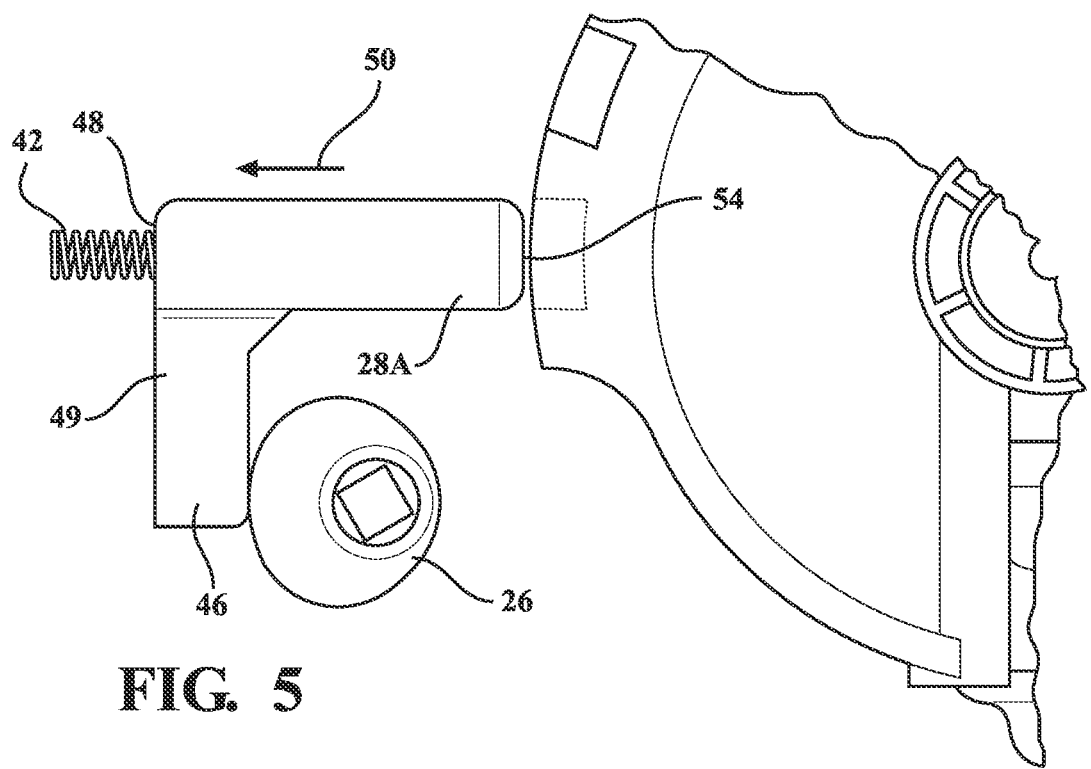
FIG. 5 is a succeeding view to FIG. 4 and depicting the rotation of the cam against the plungers, resulting in a counter-biasing and retracting motion exerted on the plungers in order to disengage from the shift lever.

In the illustrated variant, and upon the cam 26 being rotated into engagement with the plungers (by example as shown in FIG. 5), the plungers retract from the shift lever recesses, thereby permitting movement (e.g. rotation) of the shifter handle. When the cam 26 is rotated in the opposite (released) position as shown in FIG. 4, the plungers or lock arms 28A and 28B are permitted to mate with the selected recessed notch or bore 18, 20, 22 or 24 in the shifter handle to thereby prevent movement of the shifter.

In one non-limiting application (with subsequent reference to FIGS. 6-7 in particular) a dual plunger arrangement allows for a first plunger 28A to lock the lever into either of the Park or Neutral positions (notches 18 or 22), with the other plunger 28B being alternately configured to lock the shifter lever in either of the Reverse 20 or Drive 24 notched positions. Additional applications include the use of only a single plunger (corresponding to 28A) in the even only Park or Neutral positions are required.

Figure 10:
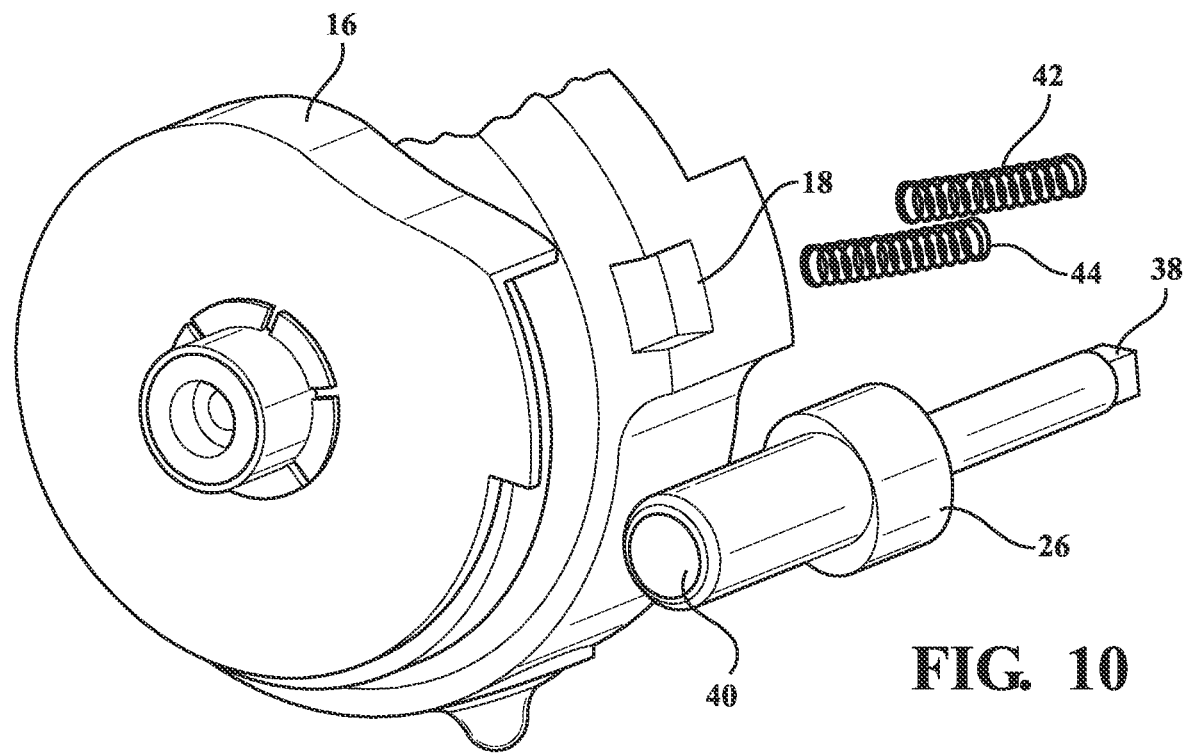
FIG. 10 is a further rotated view illustrating a cam shaft end supported magnet which, in combination with a proximately located sensor, provides a processor feedback as to a detected position of the cam.

As further described in FIG. 10, a position sensor (not shown) can be arranged in proximity to an end positioned magnet 40 associated with the rotatable lock cam 26 and by which the sensor communicates with a processor component (such as associated with a PCBA board assembly) for detecting the position of the cam. Without limitation, any arrangement of sensors (external and otherwise) can be provided in combination with the PCBA such as for providing any or park lock, neutral lock or return to park functionality.

Figure 2:
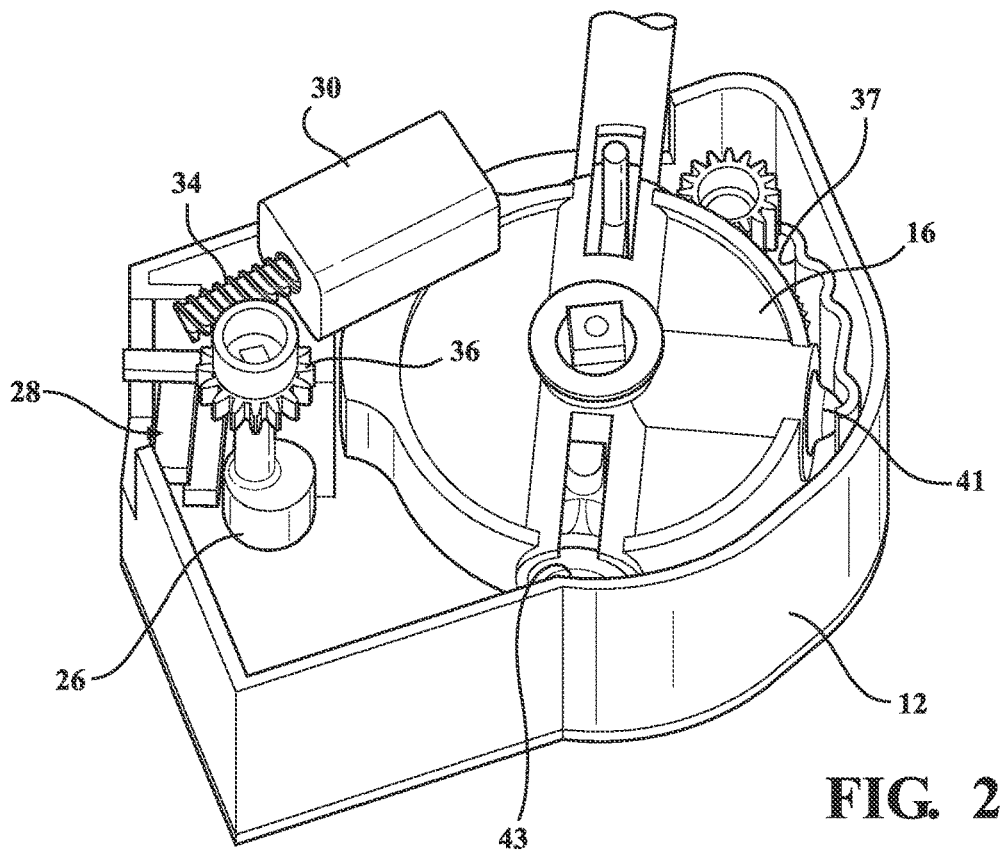
FIG. 2 is a partially assembled perspective view of the motor and gear assembly, lock cam and plungers within the left hand assembly, the plungers being in engagement with a rotatable base of the shift lever.

Referring to FIG. 2, a partially assembled perspective view is shown of the motor 30 and gear assembly (worm shaft 34, worm gear 36), slaved lock cam 26 and plungers (again generally referenced at 28 and including one more individual plungers or lock arms, these again being further again referenced at 28A and 28B). As also shown, the components are supported within the left hand assembly 12, and with the plungers being in engagement with a rotatable base of the shift lever 16 as shown. Also depicted are inner detent profiles, see additionally in FIG. 1A at 37 and 39, configured upon the inner arcuate surface of the left hand housing assembly 12, these seating opposing biasing components 41 and 43 (FIG. 2) for tactile shifter adjustment between the PRND shifter positions.

Figure 3:
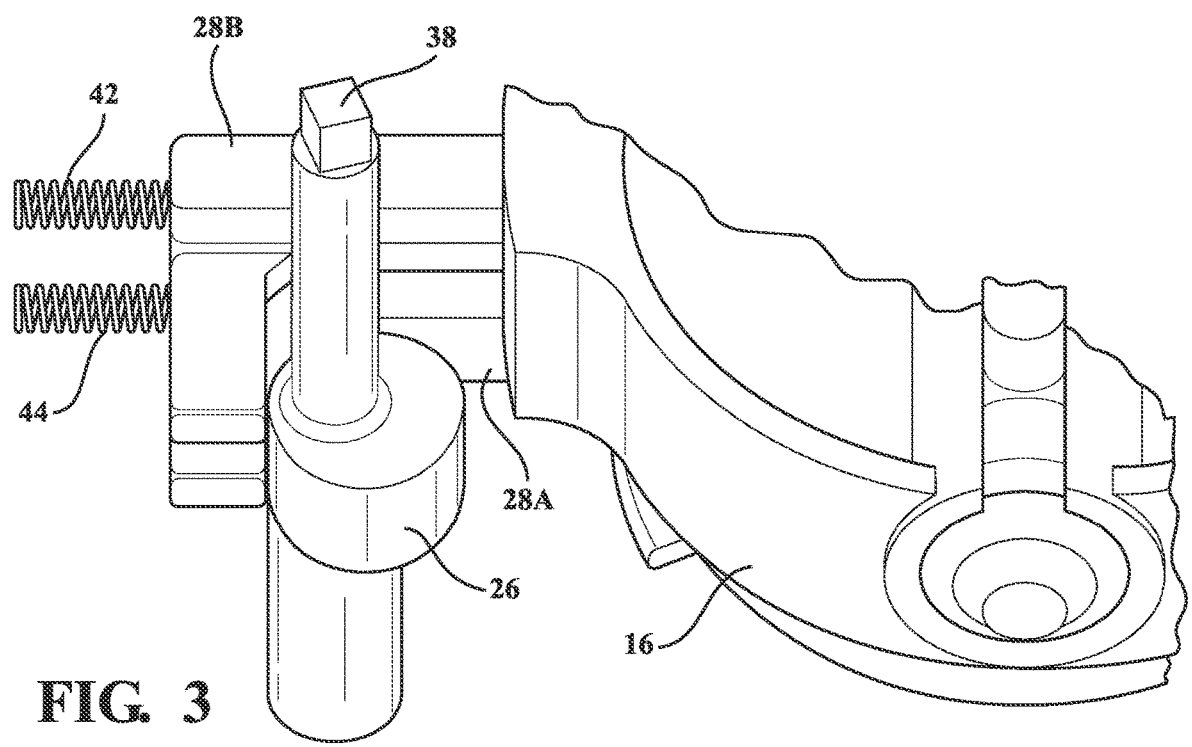
FIG. 3 is a further perspective illustrating the cam interface relationship with the plungers and which, upon rotation of the cam by the motor, results in the cam counter-biasing the spring loaded engagement of the plungers within the matching lock recesses of the shift handle in order to counter-bias retract the plunger out of engagement with the shift lever.

FIG. 3 is a further perspective illustrating the cam interface relationship with the plungers 28A and 28B and which, upon rotation of the cam 26 by the motor 30, which results in the cam counter-biasing the spring loaded engagement of the plungers (see spring 42 and 44 positioned in alignment with the matching lock recesses of the shift handle) in order to counter-bias retract the plungers out of engagement with the shift lever. As previously described, an alternate arrangement (not illustrated) contemplates the plungers 28A/28B being spring loaded in a normally disengaged condition relative to the shifter notches, with actuation of the cam 26 being required to seat or engage the plungers.

FIG. 4 depicts the interior component of the assembly without the motor and gear, and in order to better show the plungers or lever arms (a single one being depicted again at 28A corresponding to the Park 18 and Neutral 22 positions) in the locked/engaged position within the mating recesses defined in the shift lever or handle prior to engagement by the cam. Each of the plungers or lock arms depicts an angled projection (at 46 for plunger 28A and at 46' for plunger 28B) against which coacts the eccentric surface of the cam 26, and which is depicted in each of FIGS. 4-7. As further shown, the corresponding spring 42 biases against a rear edge 48 of the indicated plunger 28B, with the corresponding spring 44 biasing against a corresponding rear edge 49 of the plunger 28A, this in order to bias the same into engaging contact with the selected shifter notch recess 18, 20, 22 or 24.

Proceeding to FIG. 5, a succeeding view to FIG. 4 is shown and depicts the rotation of the cam 26 eccentric surface against the plungers (selected plunger 28A being shown), resulting in a counter-biasing and retracting motion (arrow 50) exerted on the plungers in order to disengage from the shift lever 16. As compared to FIG. 4, the cam 26 is rotated in either of clockwise or counter-clockwise directions in order to actuate the plunger (again shown by example at 28A) via its angled projecting portion 46, and in order to retract the plunger in the unseating direction to clear the surface surrounding the selected notched recesses in the shift lever, at which point the lever can be rotated.

Figure 6:
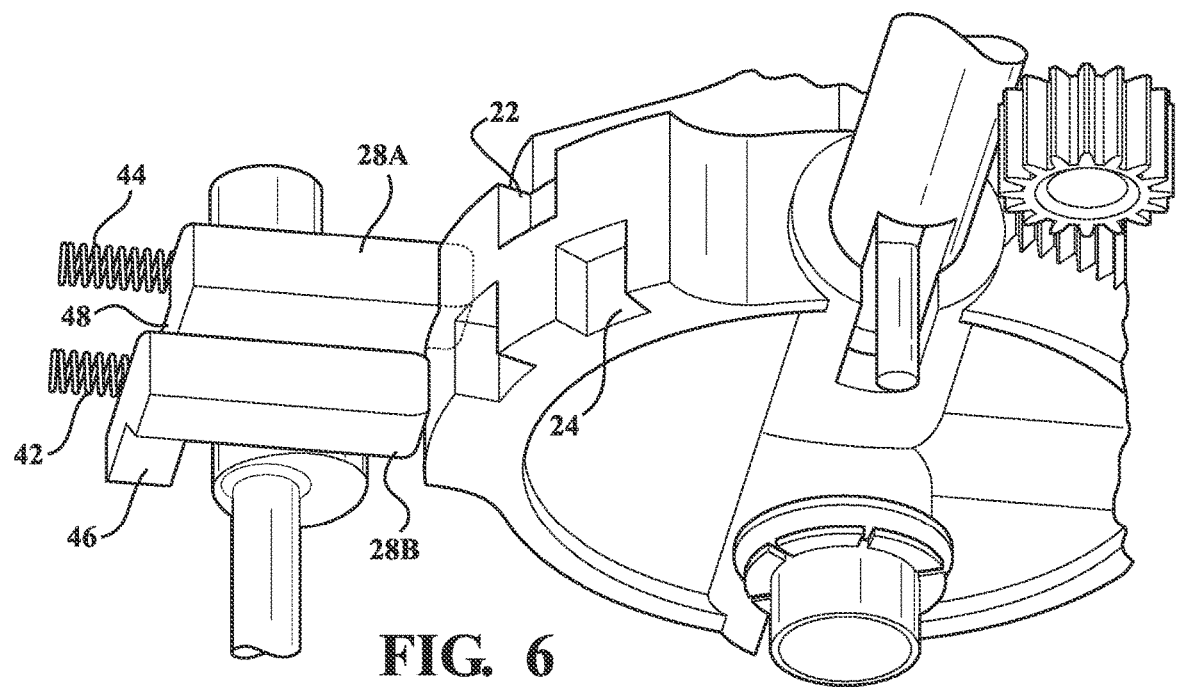
FIG. 6 presents a further rotated view of the dual plunger arrangement shown in combination with stepped recesses configured in the shift lever for mating with the plungers corresponding to given shifter positions.
Figure 7:
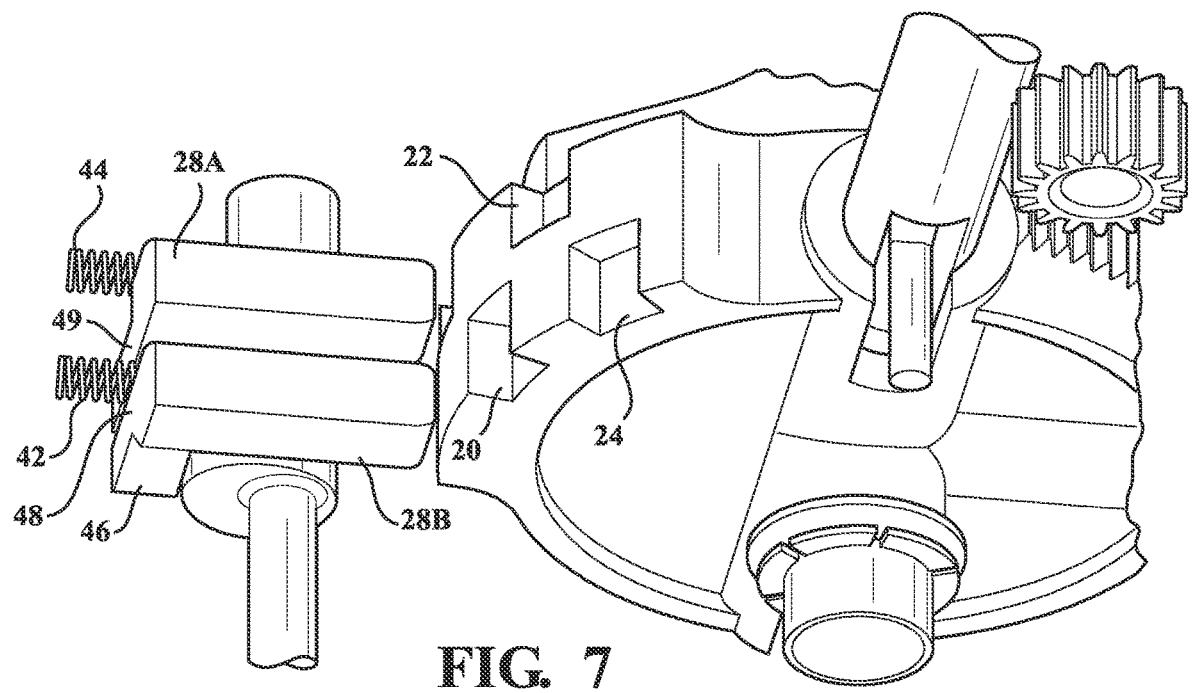
FIG. 7 is a substantial repeat of FIG. 6 and better showing cam interface position of FIG. 5 for retracting the plungers out of spring biased engagement within the mating recesses configured into the shift lever or handle.

FIG. 6 presents a further rotated view of the dual plunger arrangement 28A and 28B shown in combination with stepped recesses (again Park 18 and Neutral 22 for plunger 28A and Reverse 20 and Drive 24 for plunger 28B), again configured in the shift lever for mating with the plungers corresponding to given shifter positions. FIG. 7 is a substantial repeat of FIG. 6 and better showing cam interface 26 position of FIG. 5 for retracting the plungers 28A and 28B out of spring biased engagement within the mating recesses configured into the shift lever or handle.

Figure 8:
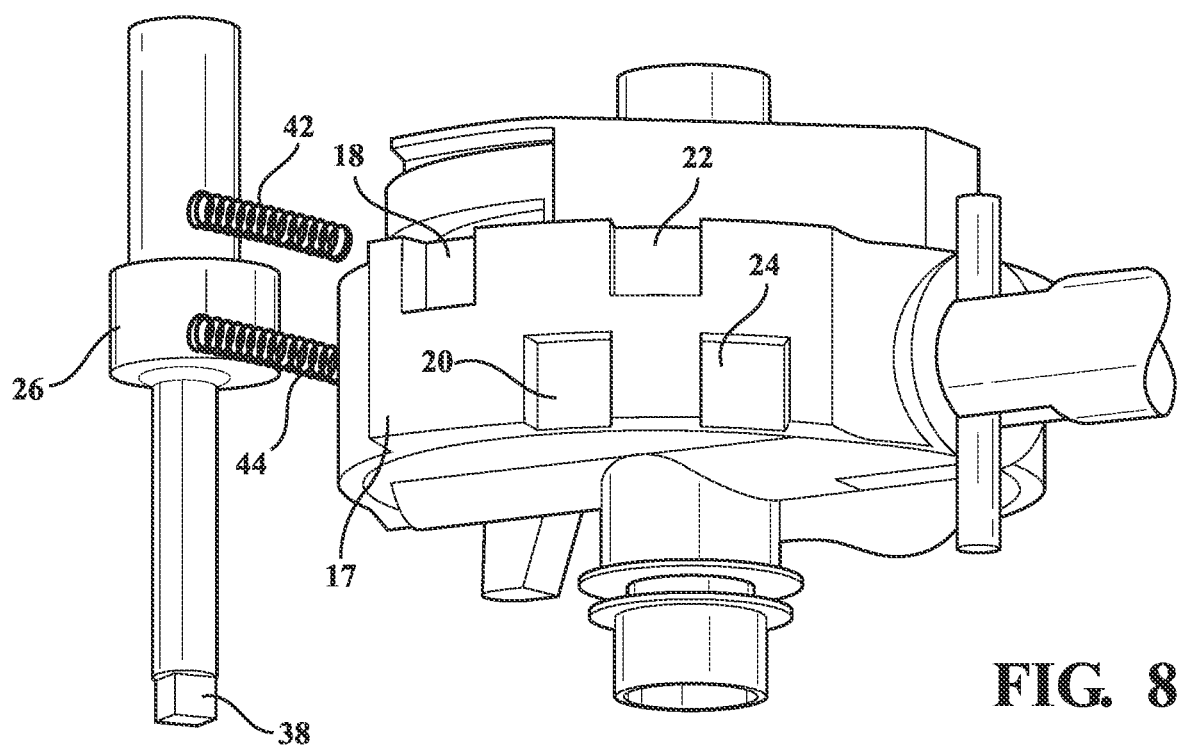
FIG. 8 presents a further illustration with the plungers or lock arms removed and better showing recessed notches in the shifter lever corresponding to each of Park, Reverse, Neutral and Drive positions.
Figure 9:
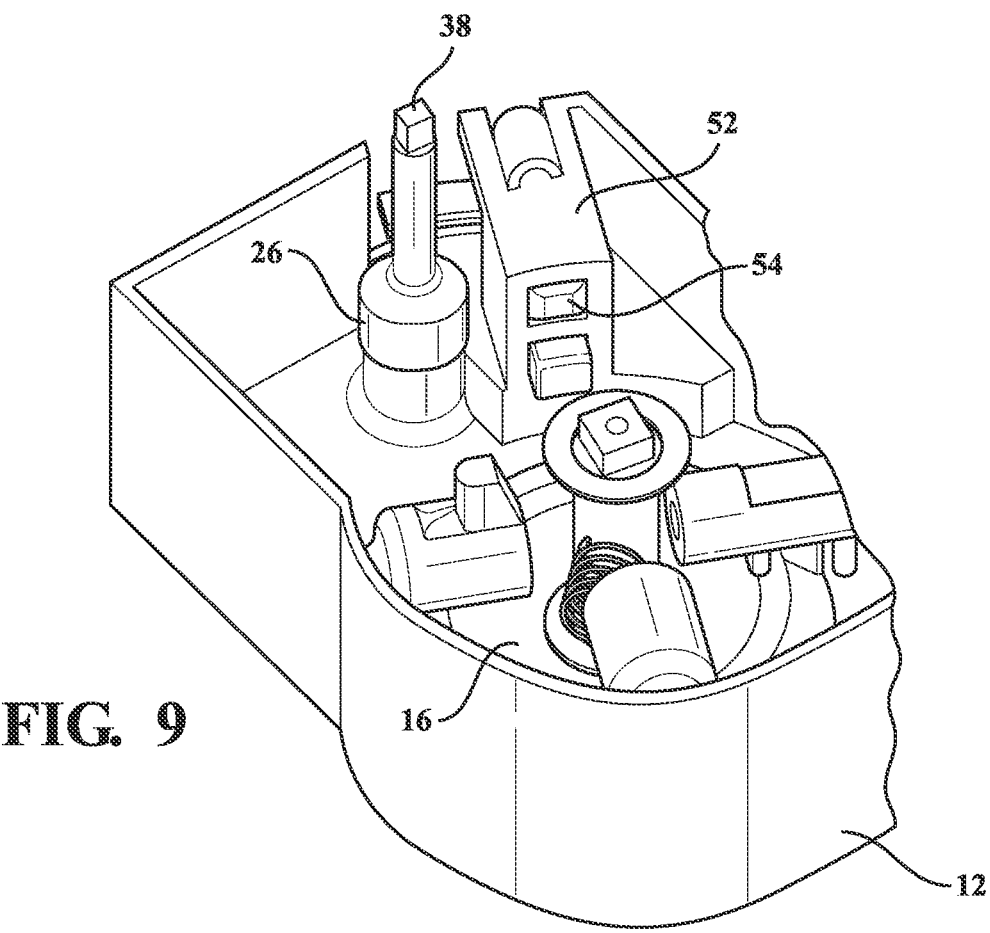
FIG. 9 provides a further sectional perspective illustrating the manner in which the plungers are displace-ably supported within the left hand housing relative to the shift lever or handle and for actuation by the cam.

FIG. 8 presents a further illustration with the plungers or lock arms removed and better showing recessed notches in the shifter lever, again corresponding to each of Park (18), Reverse (20), Neutral (22) and Drive (24) positions. FIG. 9 provides a further sectional perspective illustrating the manner in which the plungers are displace-ably supported within the left hand housing 12 (see locating pocket 52 with end aperture though which displaces engaging end face 54 (see also disengaged position of FIG. 4) of the selected plunger 28B relative to the shift lever or handle, again upon actuation by the cam. FIG. 10 presents a further rotated view illustrating a cam shaft end supported magnet 40 which, in combination with a proximately located sensor (not shown), provides a processor feedback as to a detected position of the cam 26.

Figure 11:
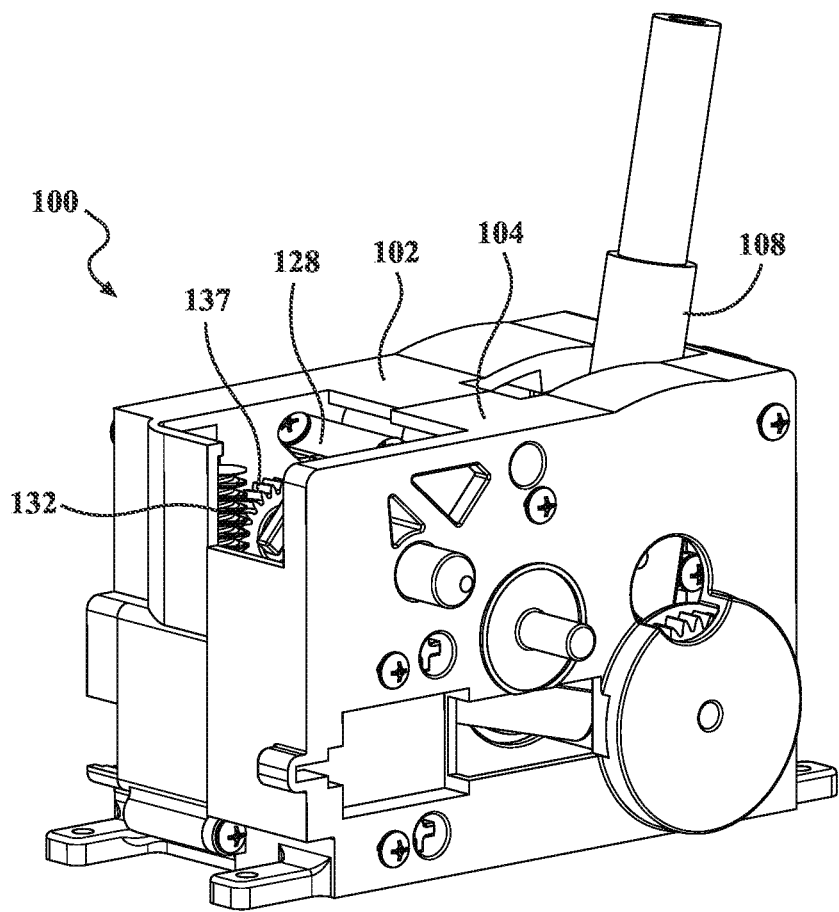
FIG. 11 is an assembled perspective and FIG. 12 an exploded view of a plunger lock mechanism according to a second non-limiting embodiment of the present invention similar to FIG. 1 and incorporated into a lever style shifter, in which a motor and gear assembly rotates a cam for actuating a pair of locking arms or plungers in fore and aft directions between a spring loaded engaged position with the lever and a retracted/disengaged position for permitting rotation of the shift lever.
Figure 12:
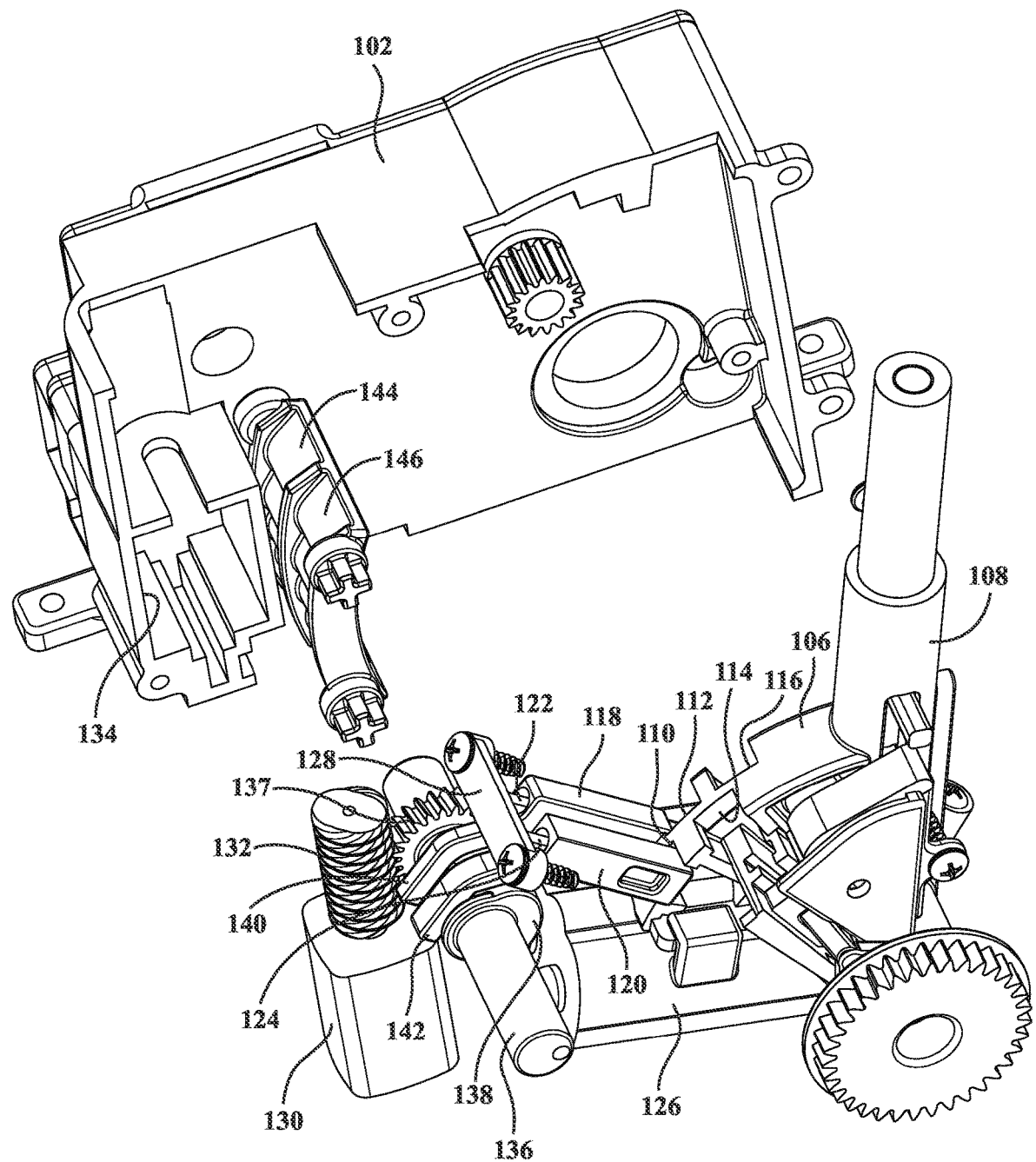

Proceeding to FIG. 11, an assembled perspective is generally shown at 100 (and in FIG. 12 in exploded view) of a plunger lock mechanism according to a second non-limiting embodiment of the present invention similar to FIG. 1 and incorporated into a similar lever style shifter as that previously described at 10. Similar to the first described variant, a pair of left handed 102 and right handed 104 housings are provided which define a package interior space for seating a shifter component including a rotationally supported and arcuate base portion 106 and an extending shifter lever 108.

The shift lever includes a plurality of bores or notches (these terms being used interchangeably) are depicted at 110, 112, 114 and 116 at alternating locations along the arcuate base 106 of the shifter lever component. A pair of plungers are depicted at 118 and 120 which are spring loaded (via springs 119 and 121) into engagement with selected ones of the bores 110, 112, 114 and 116 associated with each of the PRND shifter positions. The plungers 118/120 are interiorly axially hollowed so that they are displaceably mounted to guide supporting stems 122 and 124 (FIG. 12) extending in a downward angle toward the recessed bores.

The guide supports are in the form of stems which extend from end cross member 128 so that the forward biased ends of the plungers 118/120 are spring biased into selective engagement with a given one of the bores associated with the PRND positions. The end cross member 128 secures to the assembled housings 102/104, to retain the springs 119/121 and the plungers 118/120.

Figure 19:
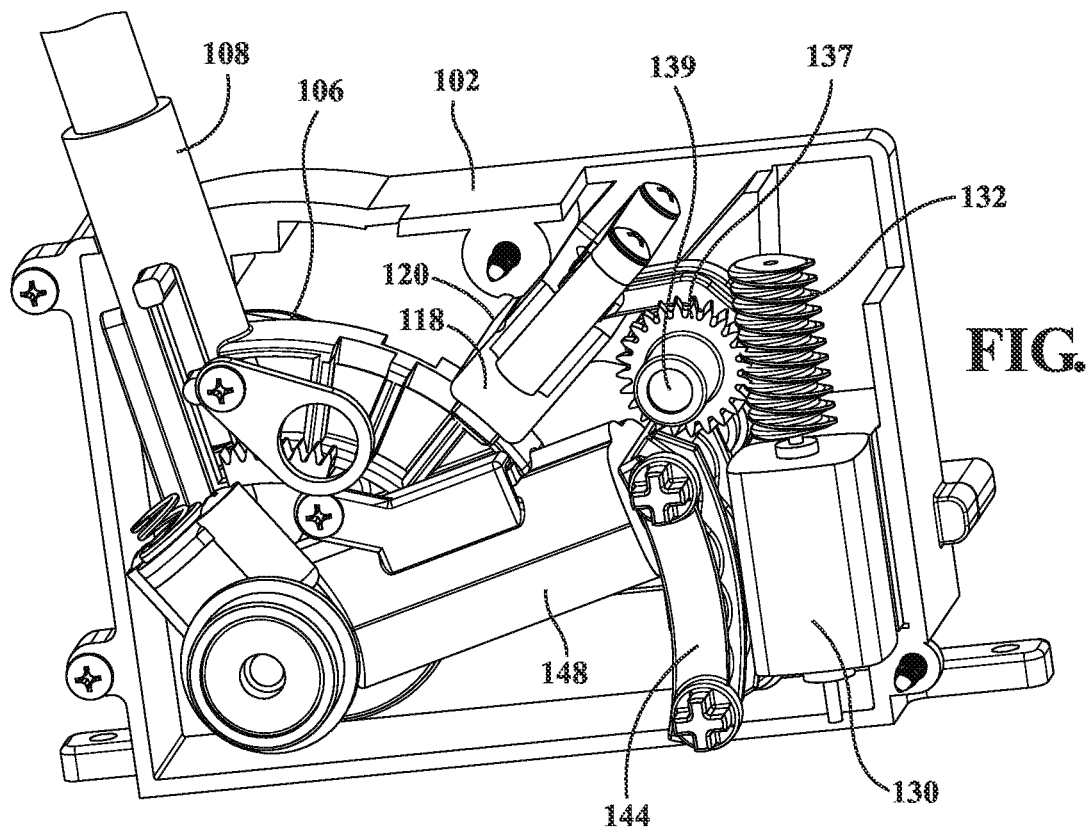
FIG. 19 is a further rotated view illustrating a cam shaft end supported magnet which, in combination with a proximately located sensor, provides a processor feedback as to a detected position of the cam.

A motor 130 and worm gear 132 assembly is provided and which seats within a pocket 134 in the left side housing 102. A lock cam includes a width extending stem 136 having a cam portion 138, the surface of which is in contact with angled legs 140/142 associated with the plungers 118/120. A geared portion 137 of the lock cam stem 136 inter-engages with the rotatable worm gear 132 in order to actuate the cam portion 138 to retract the plungers 118/120. As shown in FIG. 19, a magnet 139 is positioned upon an opposite end of the rotatable lock cam stem 136 and which, as previously described in FIG. 10 in the first variant, provides for positioning sensing by a sensor incorporated into a proximately located PCB sensor assembly (not shown) for detecting the position of the shift lever.

In operation, the motor driven cam sets the position of the spring-loaded plungers 118/120 which interface with the bores 110/112/114/116 of the shift lever. In this fashion, and as the shift lever is rotated to a given shifter position (PRND), a given one of the shift lever bores is exposed (in alternation) to the plungers 118/120 so that the forward loading spring 119/121 of a selected plunger displace the same forwardly into engagement within the bore in order to establish the given shifter position.

As with the first embodiment 10, a first of the plungers locks the lever in the Park or Neutral position, with the second of the plungers locking the lever in the Reverse or Drive positions. In the instance of only the Park or Neutral position being required, then only one plunger is needed. When the rotatable lock cam portion 138 is rotated in the retracted position, the rear extending legs 140/142 of the plungers 118/120 actuate the same in a reverse counter spring bias fashion in order to clear the shift lever and allow movement of the shift lever.

The drawings also illustrate supporting structure for facilitating shifter motion outside of the cam induced operation for actuating the plungers. This can include detent plates 144 and 146 supported within the shifter left side assembled housing 102, against which spring biased portions of the shifter engages to define a tactile gear position corresponding to the arrangement of the plunger bores. The biasing portions include an outer supporting body 148 (see FIGS. 14-16) within which is supported a pair of the biasing portions are provided, with one of which depicted at 150 in FIG. 18 biased by a spring 152 into engagement with an undulating surface of the detent plate. Other structure is generally illustrated and not described which includes the unlocking and rotation of the shifter lever apart from the functioning of the cam actuated plungers.

Figure 13:
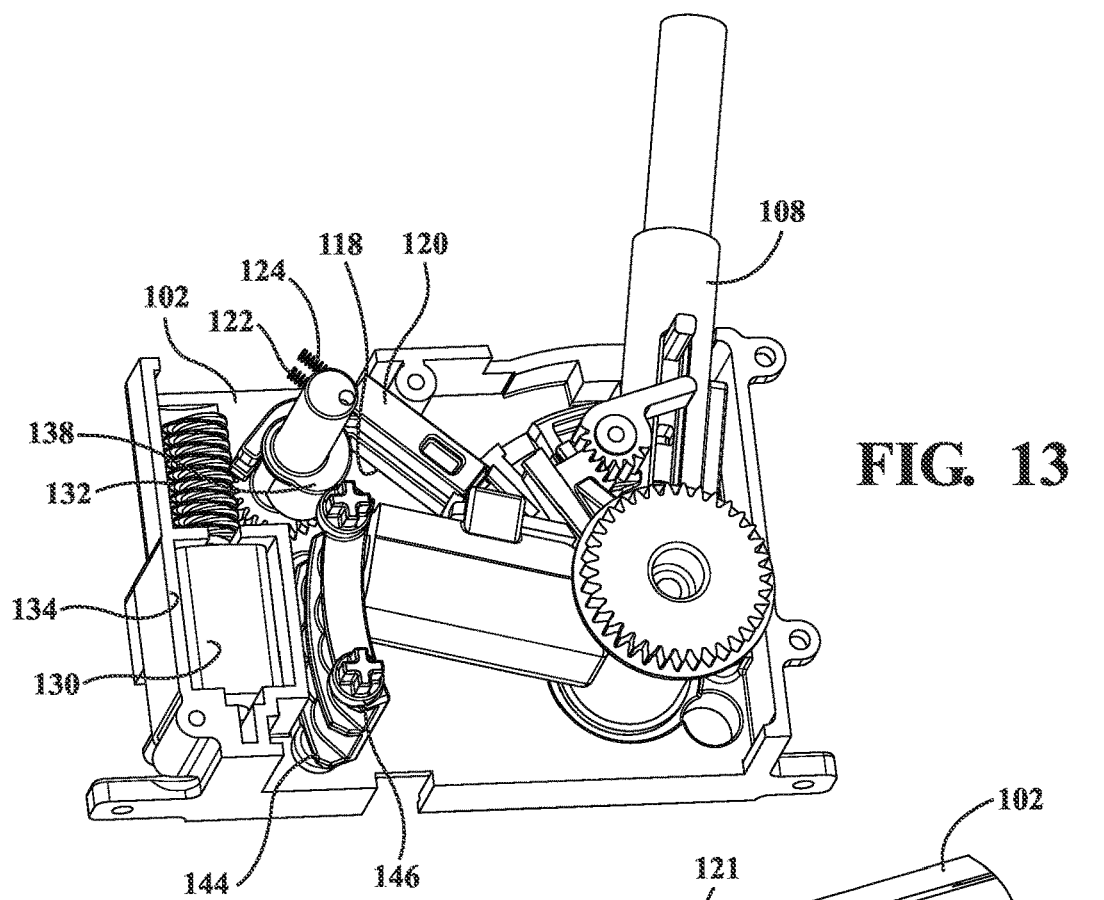
FIG. 13 is a partially assembled perspective view of the motor and gear assembly, lock cam and plungers within the left hand assembly, the plungers being in engagement with a rotatable base of the shift lever.
Figure 14:
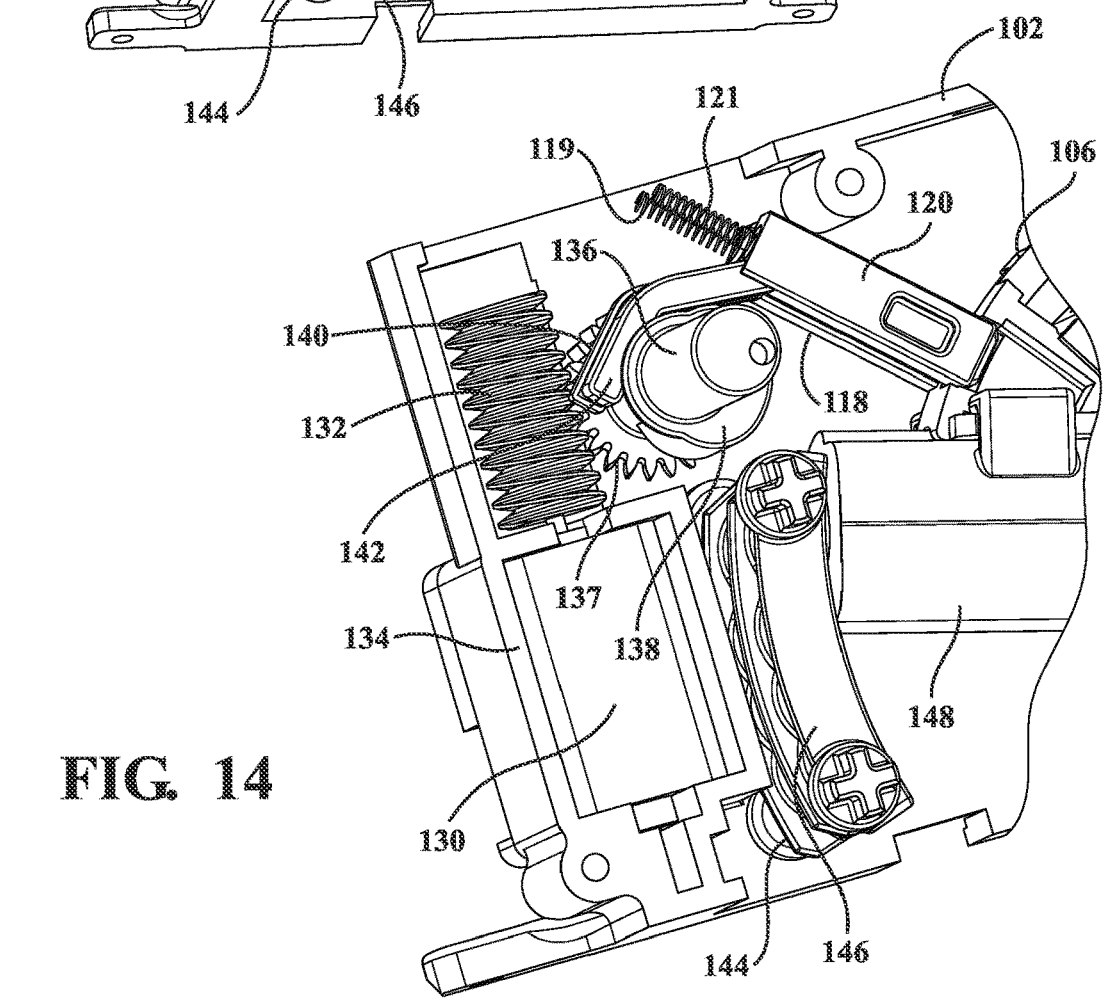
FIG. 14 is a further perspective illustrating the cam interface relationship with the plungers of FIGS. 12 and 13 and which, upon rotation of the cam by the motor, results in the cam counter-biasing the spring loaded engagement of the plungers within the matching lock recesses of the shift handle in order to counter-bias retract the plunger out of engagement with the shift lever.

FIG. 13 is a partially assembled perspective view of the motor 130 and worm gear 132 assembly, lock cam 138 and plungers 118/120 within the left hand housing assembly 102, the plungers being in selective engagement with the arcuate rotatable base 106 of the shift lever. FIG. 14 is a further perspective illustrating the cam interface relationship with the plungers 118/120 of FIGS. 12 and 13 and which, upon rotation of the cam 138 by the motor 130, results in the cam counter-biasing the spring loaded engagement of the plungers within the matching lock recesses of the shift handle in order to counter-bias retract the given plunger out of engagement with the shift lever.

Figure 15:
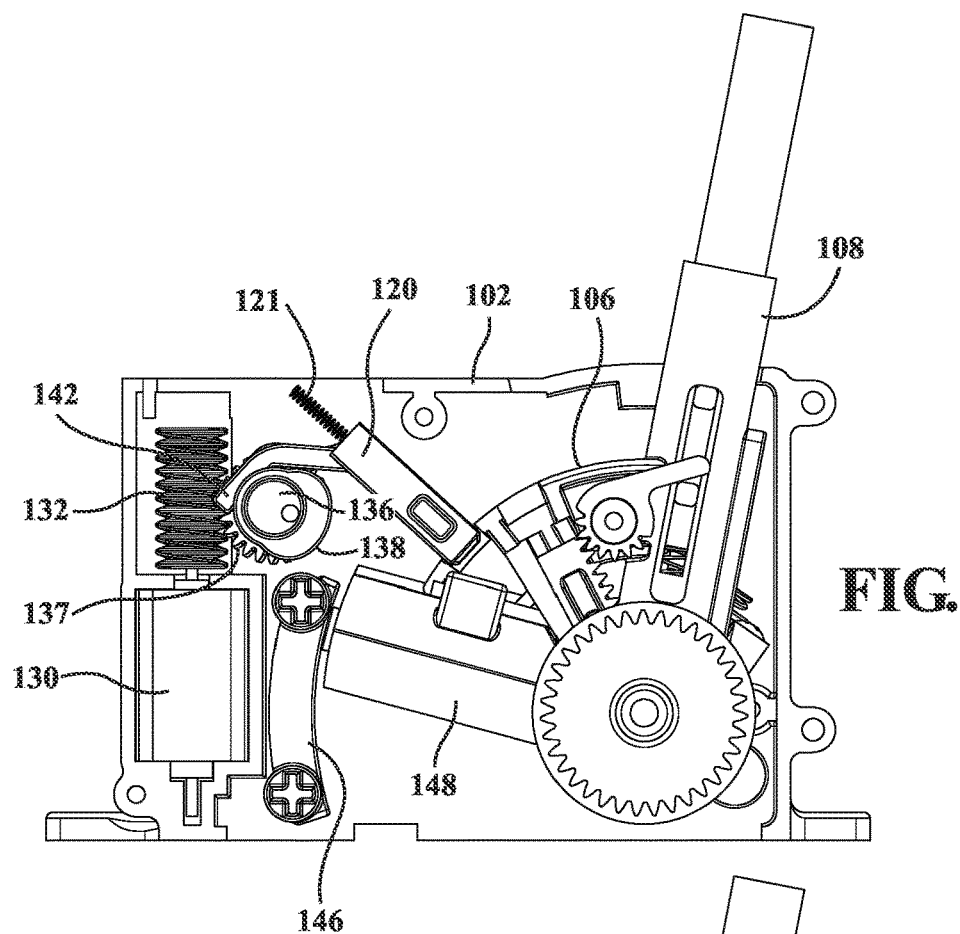
FIG. 15 depicts the interior component of the assembly, and in order to better show the plungers or lever arms in the locked/engaged position within the mating recesses defined in the shift lever or handle prior to engagement by the cam.
Figure 16:
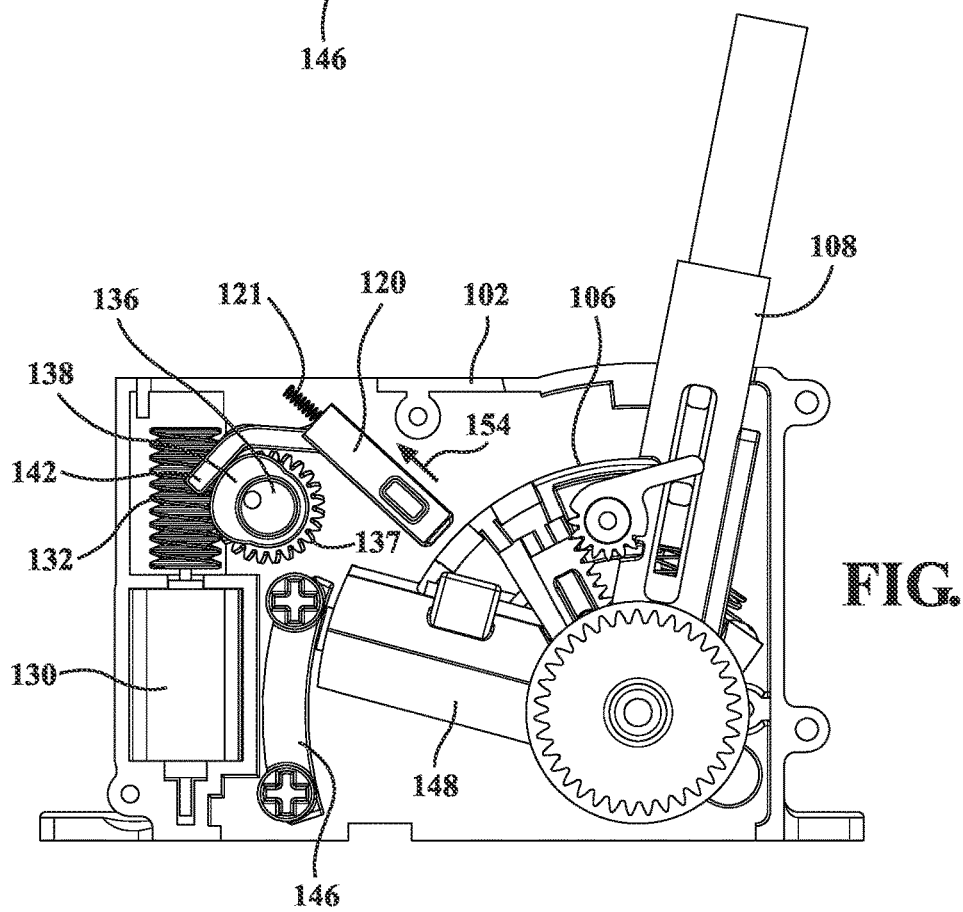
FIG. 16 is a succeeding view to FIG. 15 and depicting the rotation of the cam against the plungers, resulting in a counter-biasing and retracting motion exerted on the plungers in order to disengage from the shift lever.

Proceeding to FIG. 15, depicted are the interior components of the assembly, and in order to better show the plungers 118/120 (also termed lever arms) in the locked/engaged position within the mating bores/recesses defined in the shift lever arcuate base prior to engagement by the rotatable cam 138. FIG. 16 is a succeeding view to FIG. 15 and depicting the rotation of the cam against the plungers, resulting in a counter-biasing and retracting motion (see arrow 154) exerted on the plungers in order to disengage from the shift lever.

Figure 17:
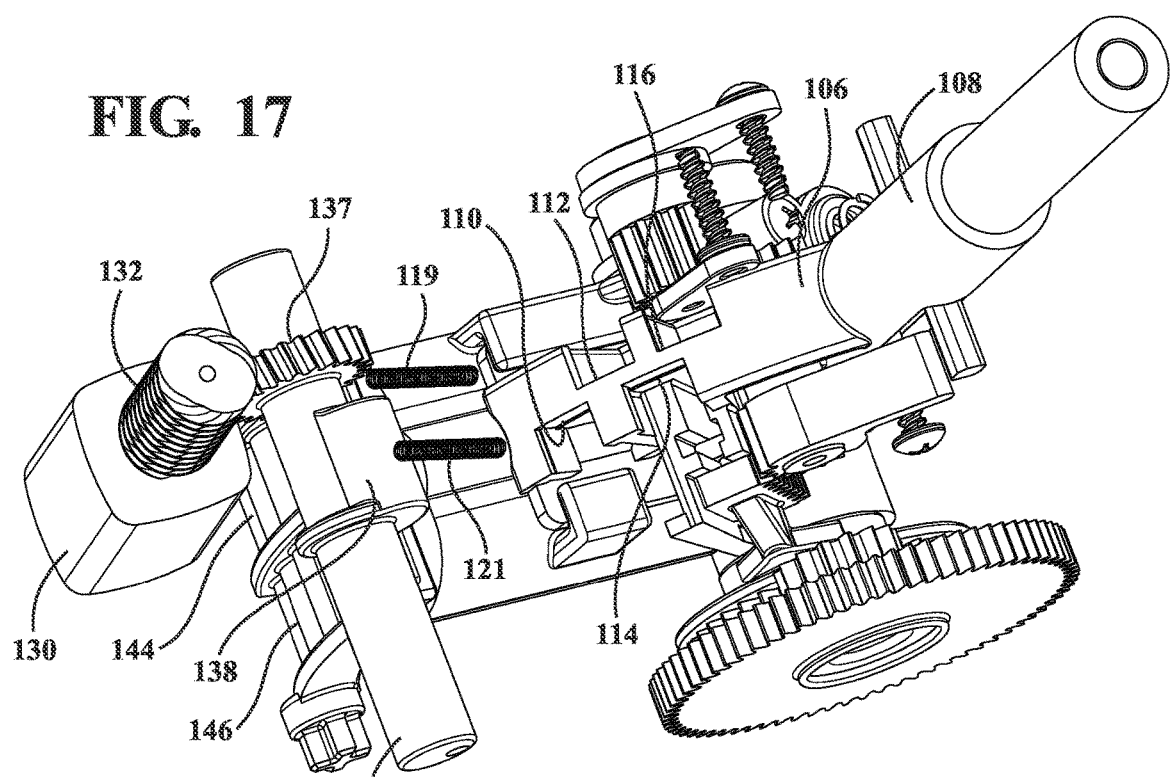
FIG. 17 presents a further illustration with the plungers or lock arms removed and better showing recessed notches in the shifter lever corresponding to each of Park, Reverse, Neutral and Drive positions.
Figure 18:
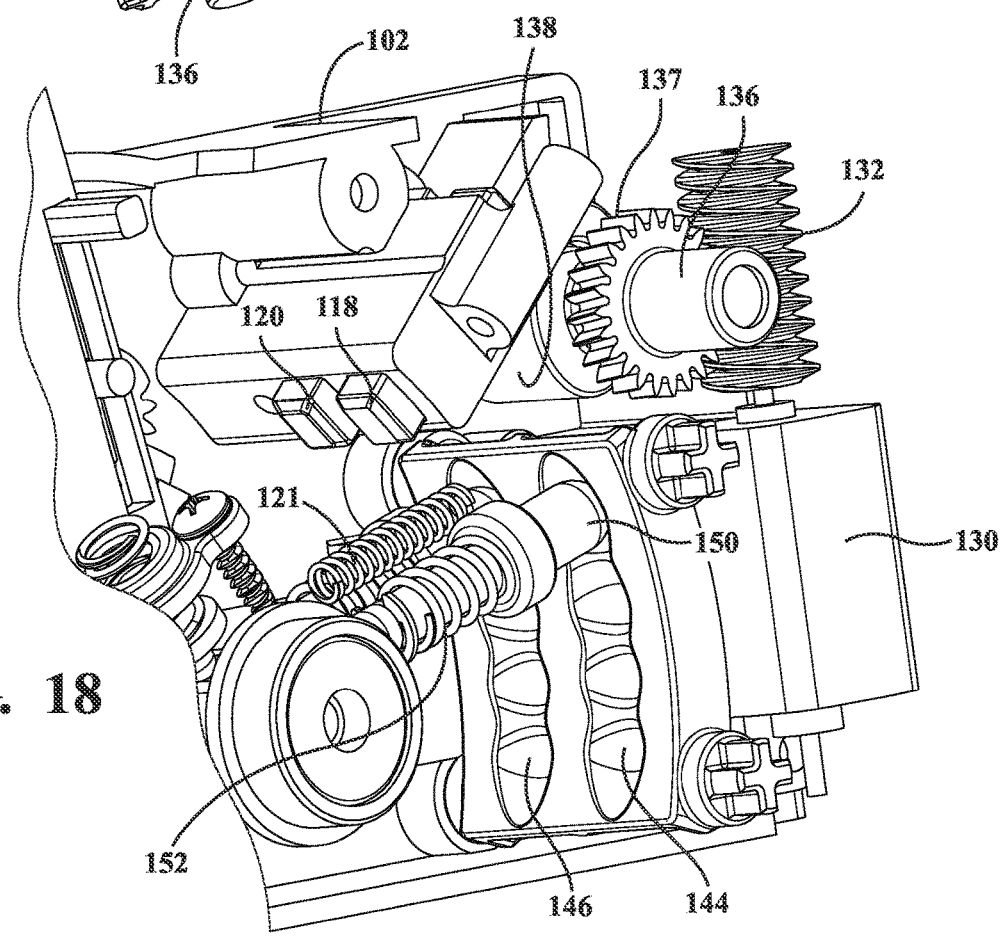
FIG. 18 provides a further sectional perspective illustrating the manner in which the plungers are displace-ably supported within the left hand housing relative to the shift lever or handle and for actuation by the cam.

FIG. 17 presents a further illustration with the plungers 118/120 or lock arms removed and better showing recessed notches 110, 112, 114 and 116 in the shifter lever corresponding to each of Park, Reverse, Neutral and Drive positions. FIG. 18 provides a further sectional perspective with certain parts removed and illustrating the manner in which the plungers 118/120 are displace-ably supported within the left hand housing 102 relative to the shift lever or handle and for actuation by the cam 138. FIG. 19 presents a further rotated view illustrating the cam shaft end supported magnet 139 which, in combination with a proximately located printed circuit board assembly (PCBA) mounted sensor (not shown) provides a processor feedback as to a detected position of the cam.

Figure 20:
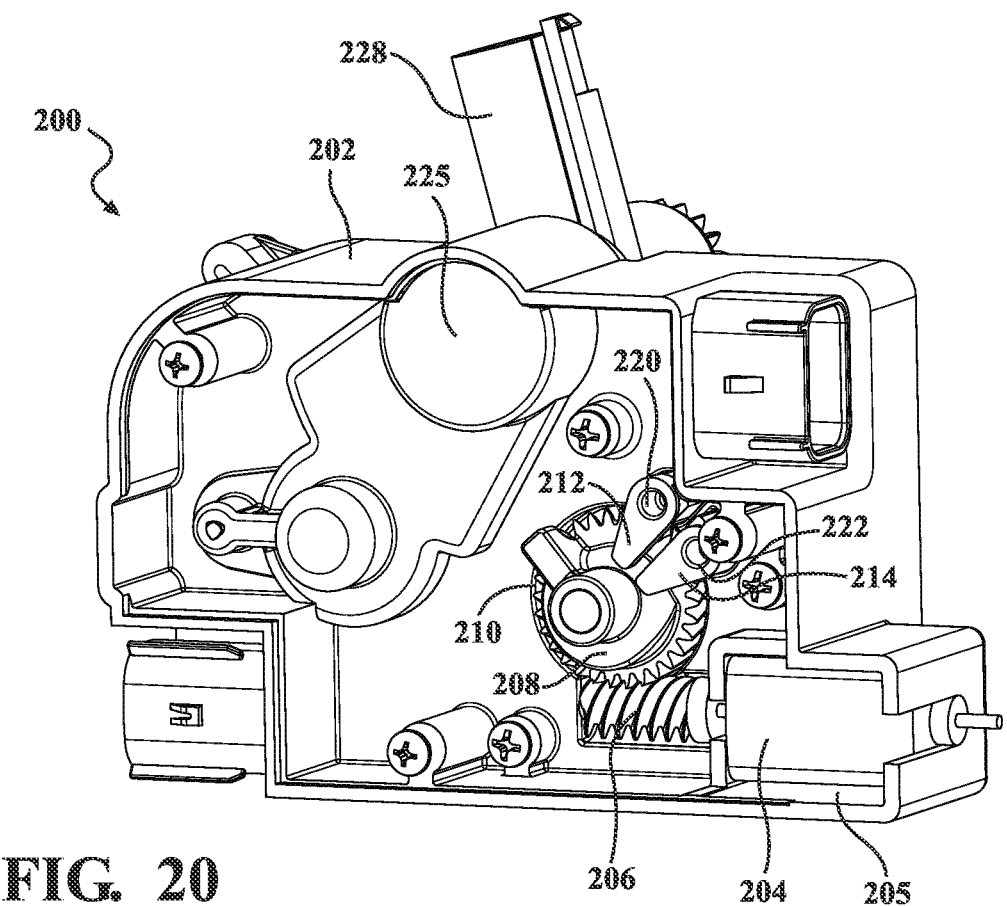
FIG. 20 is an assembled perspective and FIG. 21 an exploded view of a plunger lock mechanism according to a third non-limiting embodiment of the present invention incorporated into a lever style shifter, in which a motor and gear assembly rotates a cam for actuating a pair of locking arms or plungers in crosswise extending direction between a spring loaded engaged position with the lever and a retracted/disengaged position for permitting rotation of the shift lever.
Figure 21:
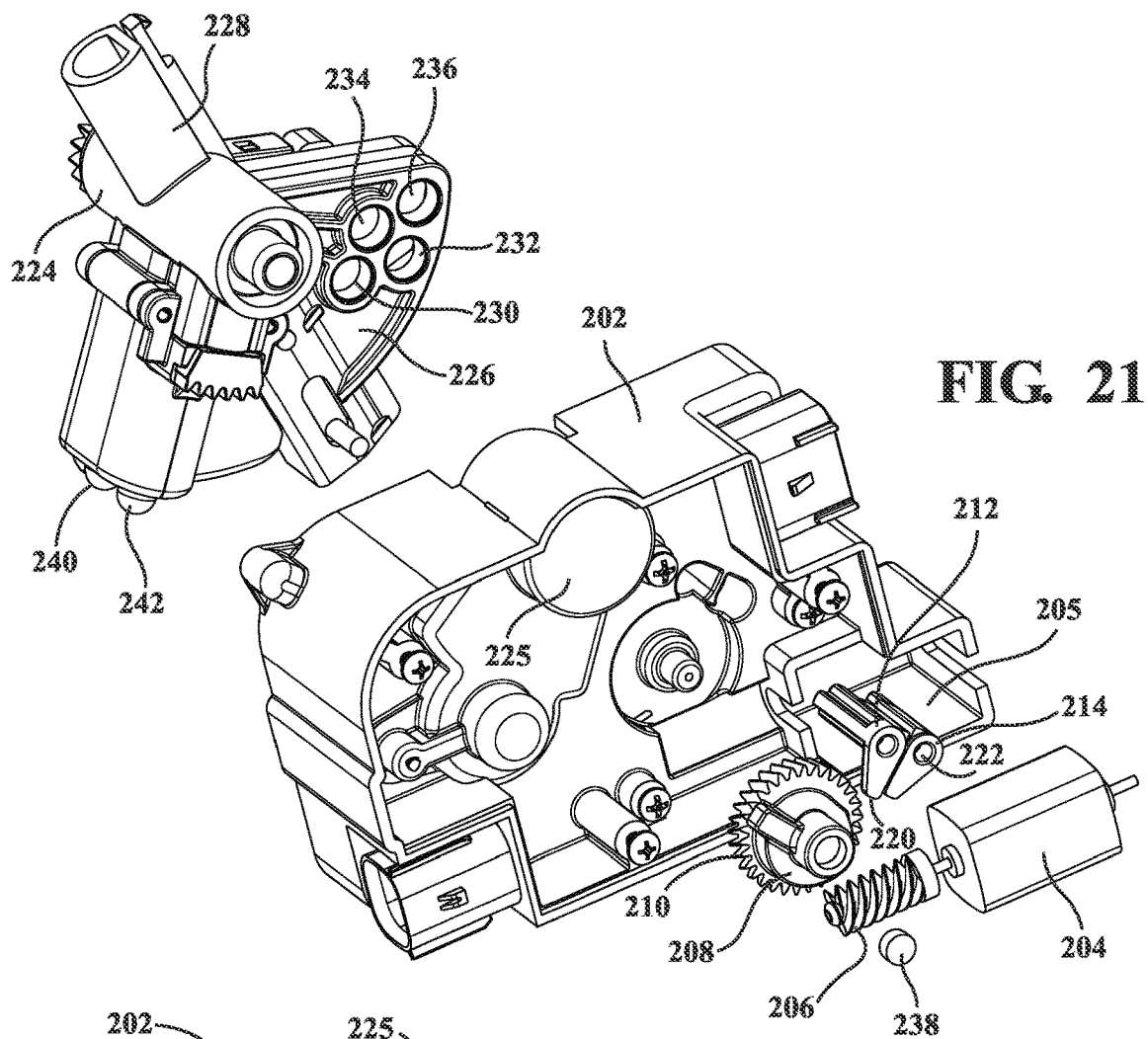

Proceeding to FIG. 20, an assembled perspective is generally shown at 200 of a plunger lock mechanism according to a third non-limiting embodiment, with FIG. 21 further providing an exploded view, incorporated into a lever style shifter. In contrast to the variants 10 and 100 previously described, a further variant of the motor and gear assembly rotates a cam for actuating a reconfigured pair of locking arms or plungers in a crosswise extending direction between a spring loaded engaged position with the lever and a retracted/disengaged position for permitting rotation of the shift lever.

A left handed housing 202 is depicted with a left hand housing cover not being shown and which defines therebetween a package receiving space for supporting each of a motor 204 with extending worm 206 (see also configured pocket 205), a rotatable lock cam 208 with outer circumferential worm gear profile 210 inter-engaging with the motor driven worm 206, and a pair of plungers 212/214 with integrated angled ends or legs for coacting with the radial end face profile of the lock cam 208. A pair of springs 216 and 218 are provided which, upon installation in the housing, seat against recessed end faces (see at 220 and 222) of the plungers 212/214 in order to bias the same in a lateral (or cross car) direction.

A redesigned shift lever assembly is shown including a central location at 224 which is pivotally secured to the left hand housing 202 (see at pivotal receiving location 225) on an outside facing surface of the housing. The shift lever assembly includes a wedge shaped base 226 extending from the central pivotal support 224 in a first direction, and an extending shift lever 228 extending from the central pivotal support in an opposition direction. A plurality of bores 230, 232, 234 and 236 (corresponding to PRND shifter positions) are distributed along a surface of the wedge shaped base 226 such that, upon pivoting of the lever 224 relative to the housing 202, the wedge face supported bores individually and successively align with the lateral (cross car) positioned and opposing spring biased plungers 212/214.

As with the previous embodiments, the motor driven cam 208 sets the position of the spring-loaded plungers 212/214 which interface with the bores 230, 232, 234 and 236 configured on the wedge shaped base 226 of the shift lever. As the shift lever is rotated to a desired position PRND, a corresponding one of the bores is aligned with and exposed to the plungers, allowing the spring loaded plungers to bias into contact with the bores.

When the rotatably actuated cam 208 is in the retracted position, the plungers 212/214 are counter-biased influenced (via the progressive ramp of the circumferential directed and radial end face of the cam pulling the plungers inwardly via their angled ends) so as to clear the shift lever to allow movement thereof. As with the prior embodiments, a first of the plungers is configured to lock the lever in the Park or Neutral positions, with the other locking the lever in the Reverse or Drive positions.

Figure 29:
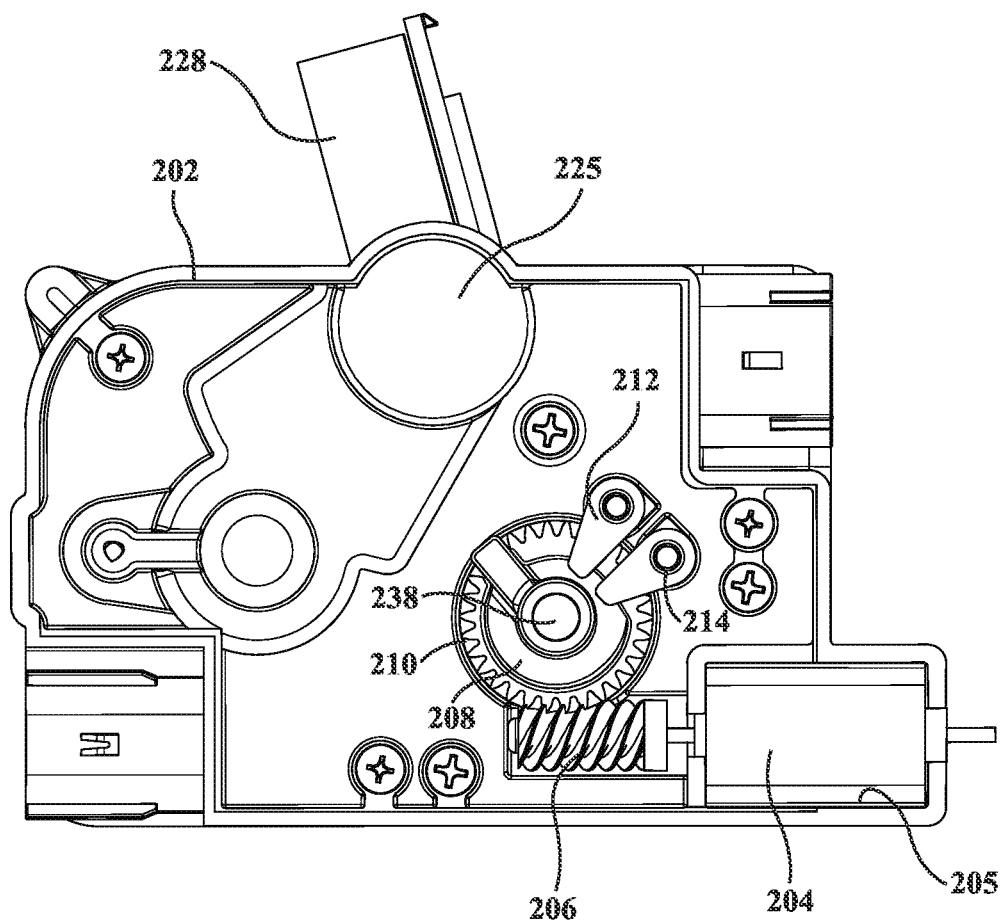
FIG. 29 illustrates a cam end supported magnet which, in combination with a proximately located sensor, provides a processor feedback as to a detected position of the cam.

A cam end supported magnet 238 (see also FIG. 29 in plan view) is supported in a central end face of the which, in combination with a proximately located sensor (not shown) provides a processor feedback as to a detected position of the cam component. As further best shown in FIG. 21, the shift lever assembly further includes additional spring biased portions, see at 240/242 which are outside of the direct teachings of the present invention and which, in combination with opposing detent plates (not shown) secured within the housing, assist in tactile shifting motion of the shift lever between the PRND positions.

Figure 22:
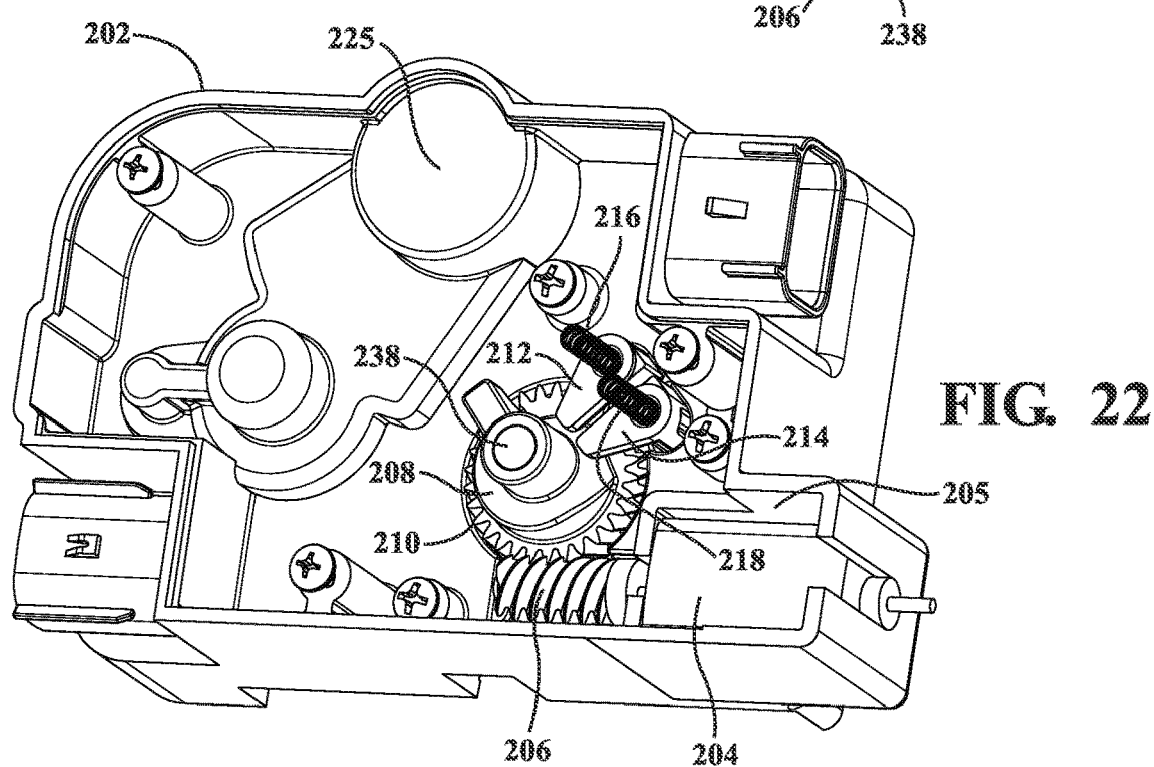
FIG. 22 is a partially assembled perspective view of the motor and gear assembly, lock cam and plungers within the left hand assembly, with the rotation of the cam by the motor interfacing with the plungers compressing the springs to pull the plungers out of the shift lever or rotating to allow the springs to press the plungers into the shift lever.

FIG. 22 is a partially assembled perspective view of the motor 204 and worm 206 assembly, along with the lock cam 208 and plungers 212/214 within the left hand housing assembly 202, with the rotation of the cam by the motor interfacing with the plungers, to in turn compress the springs 216/218 to pull (forcibly retract) the plungers out of the shift lever. As previously described, rotation of the ramped exterior radial and circumferential extending profile 208 of the rotatably driven cam in a descending direction displaces away from the integral end legs of the plungers 212/214, thereby allowing the springs to press the plungers into the shift lever bores.

Figure 23:
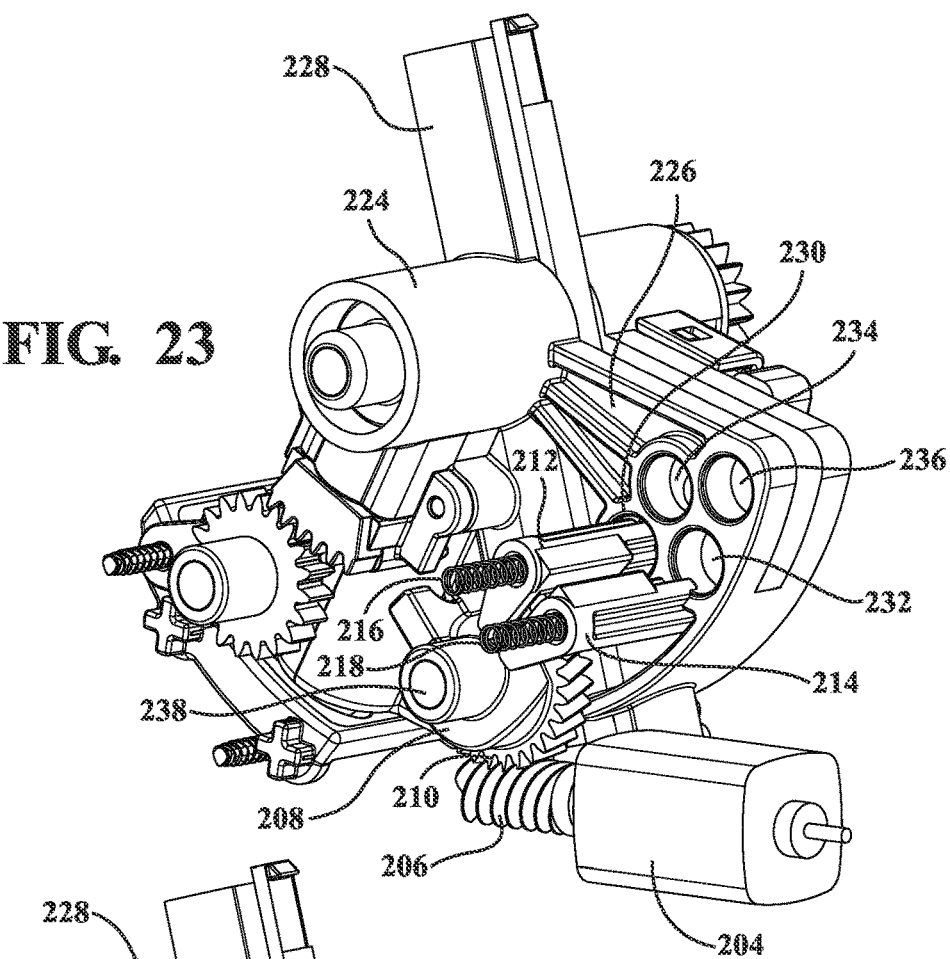
FIG. 23 depicts the interior component of the assembly, and in order to better show the plungers or lever arms in the locked/engaged position within the mating recesses defined in the shift lever or handle prior to engagement by the cam and with the springs biasing the plungers into the shift lever with the cam restricting the distance the plunger can travel.

FIG. 23 depicts the interior component of the assembly, and in order to better show the plungers 212/214 (alternatively termed lever arms) in the locked/engaged position within the mating recesses or bores 230, 232, 234 and 236 defined in the shift lever or handle, prior to engagement by the cam 208, and with the springs 216/218 biasing the plungers into the shift lever, with the cam restricting the distance the plunger 212/214 can travel.

Figure 24:
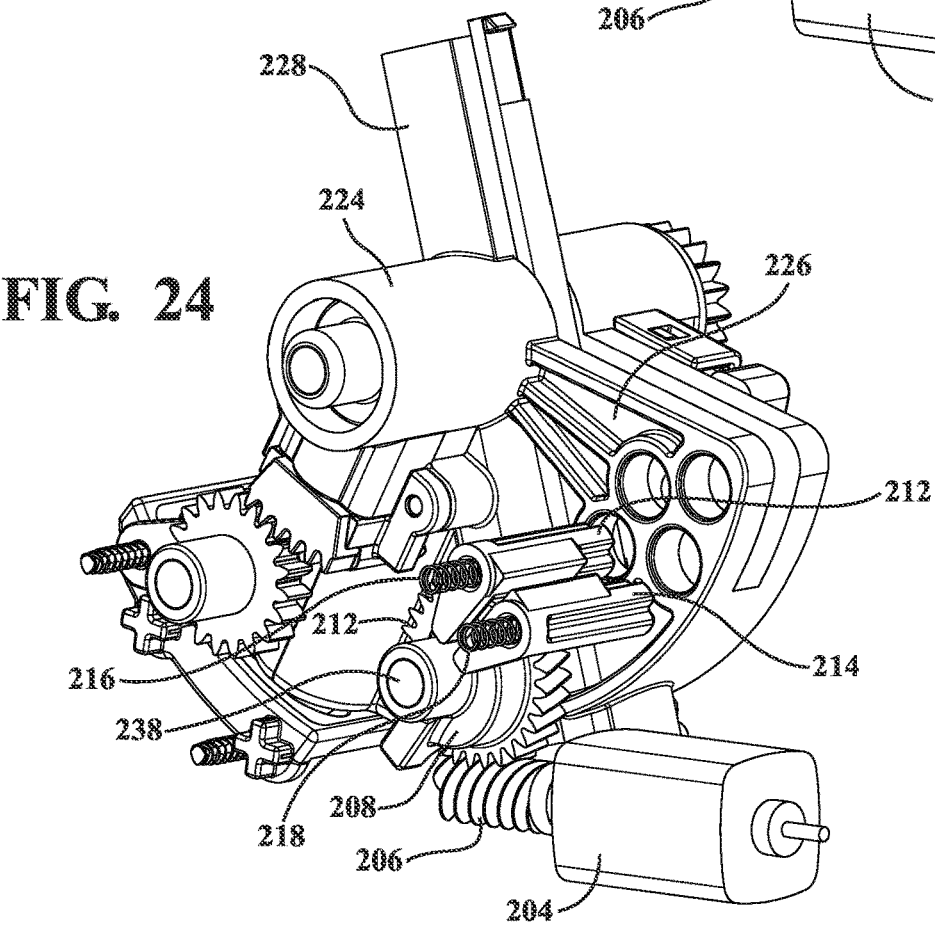
FIG. 24 is a succeeding view to FIG. 23 and depicting the rotation of the cam against the plungers, resulting in a counter-biasing and retracting motion exerted on the plungers in order to disengage from the shift lever.
Figure 25:
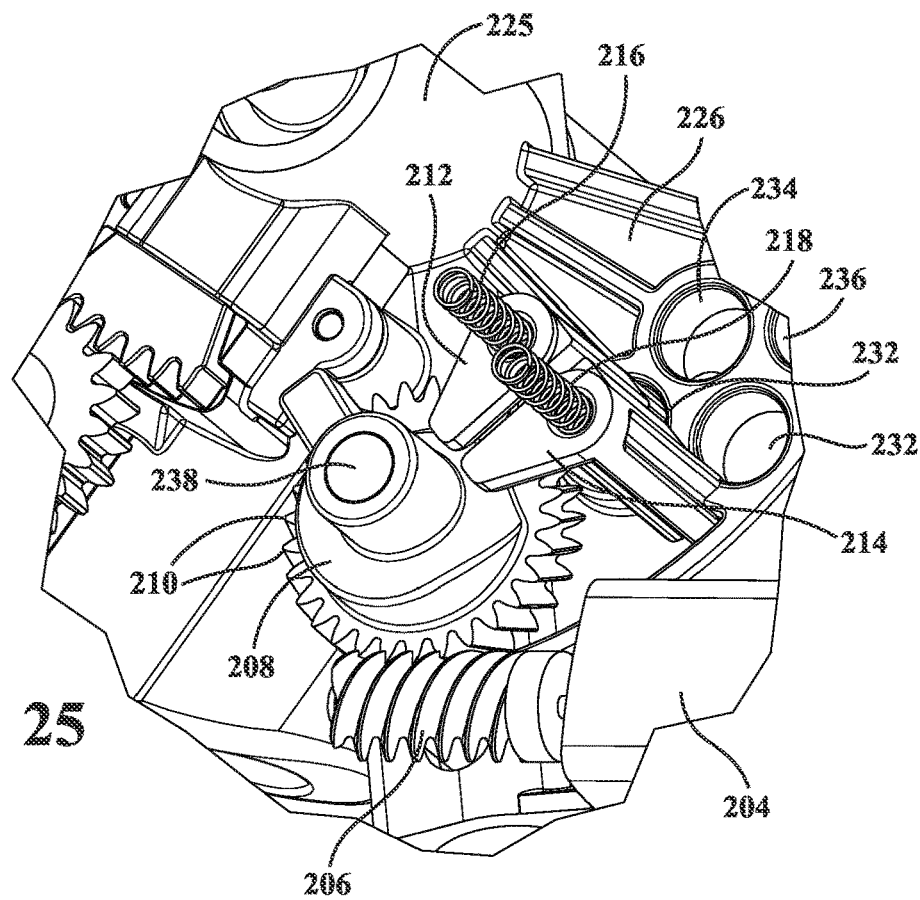
FIG. 25 presents a further rotated view of the dual plunger arrangement shown in combination with stepped recesses configured in the shift lever for mating with the cross car extending plungers corresponding to given shifter positions.

FIG. 24 is a succeeding view to FIG. 23 and depicting the rotation of the cam 208 against the plungers 212/214, resulting in a counter-biasing and retracting motion exerted on the plungers and supporting springs 216/218 in order to disengage the plungers from the shift lever. FIG. 25 presents a further rotated view of the dual plunger arrangement shown in combination with stepped recesses configured in the shift lever for mating with the cross car extending plungers 212/214 corresponding to given shifter positions.

Figure 26:
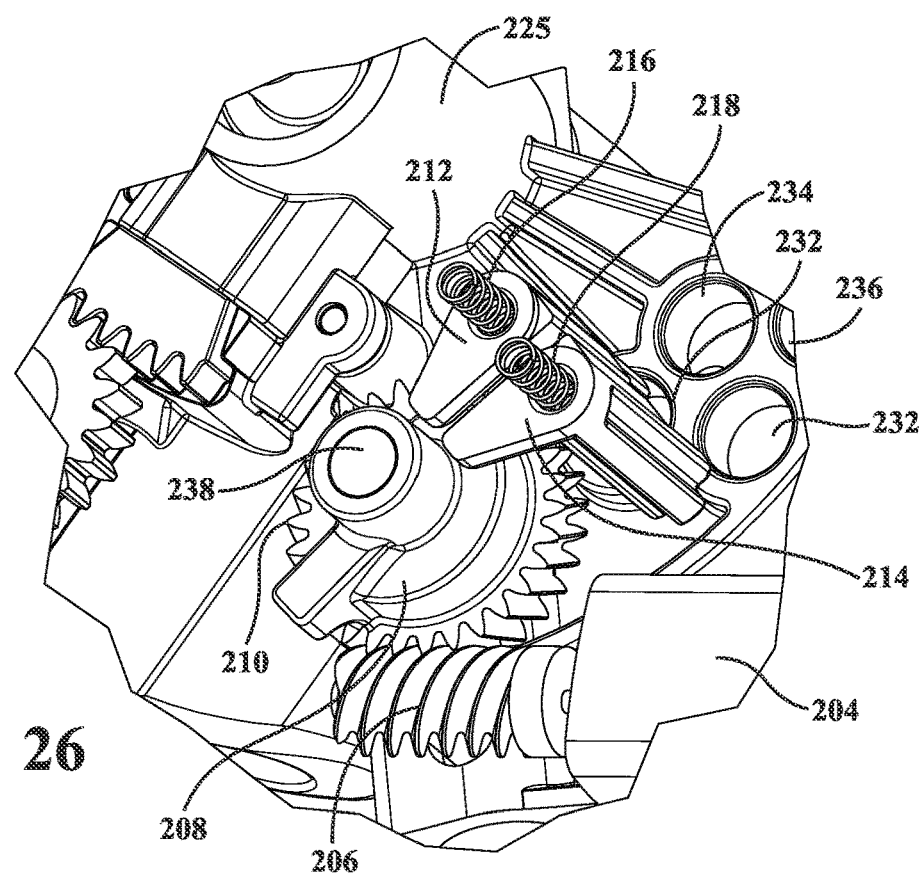
FIG. 26 is a substantial repeat of FIG. 25 and better showing cam interface position of FIG. 24 for retracting the plungers out of spring biased engagement within the mating recesses configured into the shift lever or handle.
Figure 27:
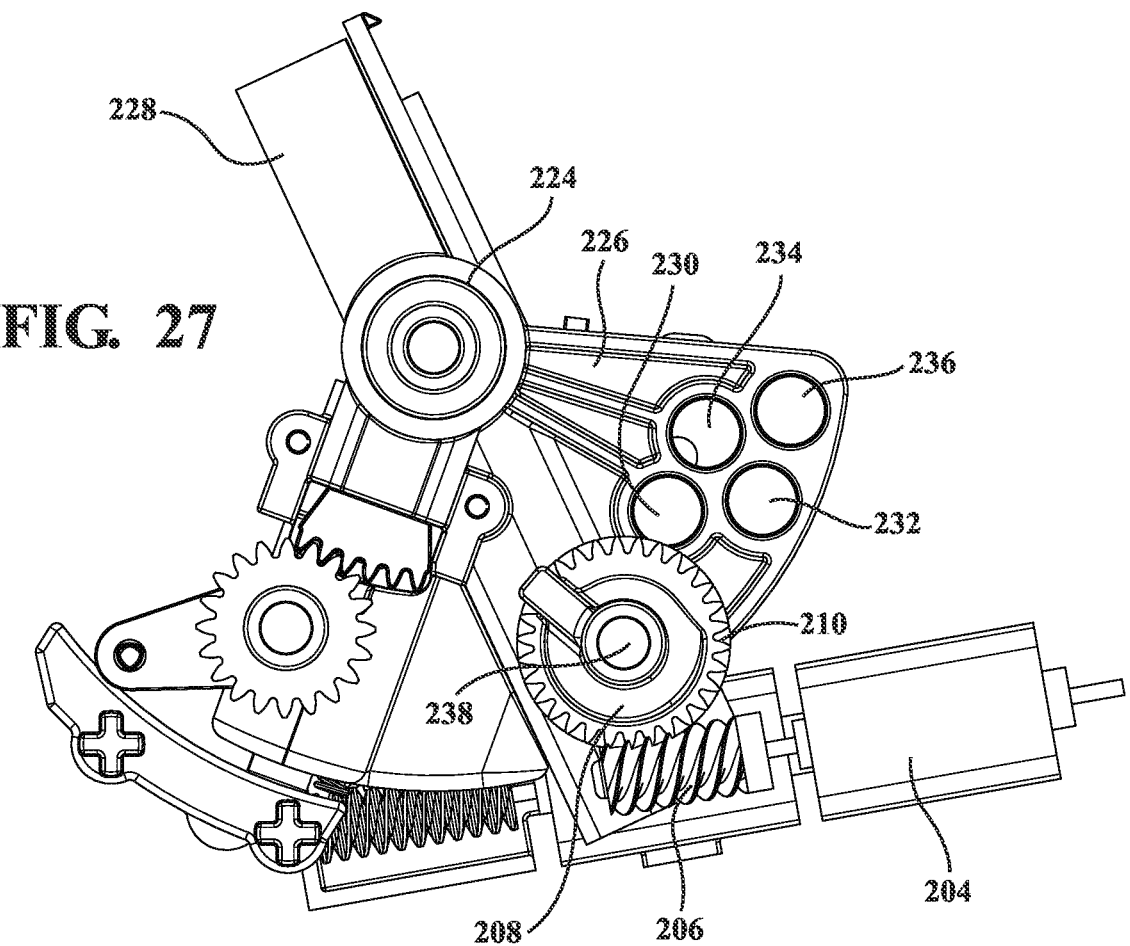
FIG. 27 is a plan view with the left side housing and plungers or lock arms removed and better showing the laterally recessed notches in the shifter lever corresponding to each of Park, Reverse, Neutral and Drive positions for seating the cross-car extending plungers.

FIG. 26 is a substantial repeat of FIG. 25 and better showing cam interface position of FIG. 24 for retracting the plungers 212/214 out of spring biased engagement within the mating recesses configured into the shift lever or handle. FIG. 27 is a plan view with the left side housing 202 and plungers or lock arms 212/214 removed and better showing the laterally recessed notches 230, 232, 234 and 236 in the shifter lever corresponding to each of Park, Reverse, Neutral and Drive positions for seating the cross-car extending plungers.

Figure 28:
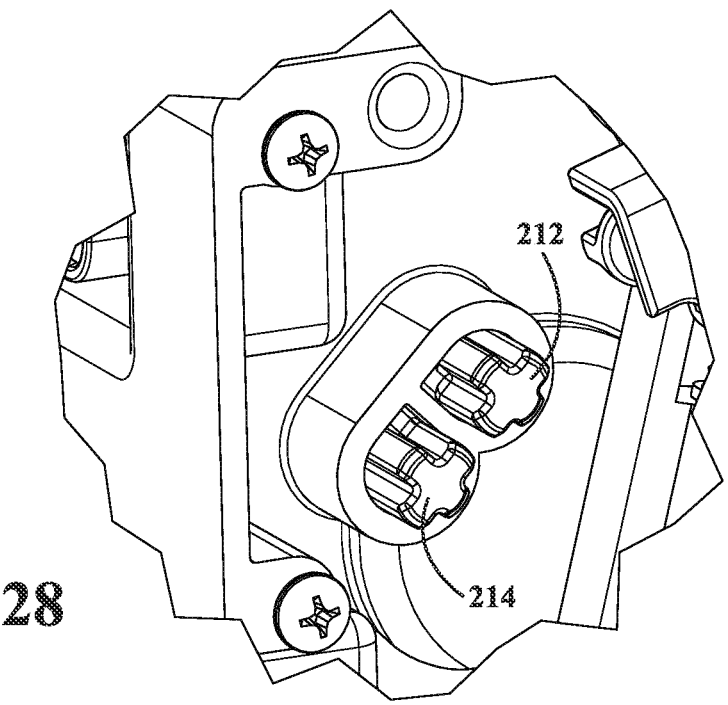
FIG. 28 illustrates a reverse-facing side of the plungers to left hand housing interface.

FIG. 28 illustrates a reverse-facing side of the plungers 212/214 to left hand housing interface. Figure again 29 illustrates the cam end supported magnet 238 which, in combination with a proximately located sensor, provides a processor feedback as to a detected position of the cam 238.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A plunger lock mechanism, comprising:
a housing supporting a pivotally adjustable lever shaped component, a base portion of said lever component exhibiting a plurality of notches;
a pair of plungers supported with said housing in opposing arrangement relative to said notches, each of said plungers having a displaceable main body with a forward end engaging one of said notches, said plungers each having an angled leg which contacts a single eccentric profile of a rotatable cam; and
an electric motor configured to rotate said cam within said housing, said eccentric profile of said cam actuating said pair of plungers to linearly displace between either of engaged and disengaged positions relative said notches such that, when disengaged, permitting rotation of said lever component.

2. The mechanism of claim 1, said housing further comprising right and left hand assemble-able portions defining a package receiving space therebetween.

3. The mechanism of claim 1 said electric motor further comprising a worm gear engaging an outer keyed end of said cam in slaved relationship so that actuation of said motor causes rotation of said cam.

4. The mechanism of claim 1, further comprising a first of said pair of plungers in aligning relationship with Park and Neutral shifter locations and a second of said pair of plungers in aligning relationship with Reverse and Drive positions associated with said lever component.

5. The mechanism of claim 4, further comprising first and second coil springs for biasing said first and second plungers in an engaged position relative to said lever component.

6. The mechanism of claim 1, further comprising a magnet supported upon an end of said cam and, in response to rotation relative to a proximately located sensor, detecting a position of said cam.

7. The mechanism of claim 1, said base portion of said lever further comprising an arcuate end profile within which are formed said notches.

8. The mechanism of claim 7, further comprising said pair of plungers being arrayed in a linear relationship relative to a direction of travel of said lever component for selectively engaging said notches in said arcuate end profile.

9. The mechanism of claim 1, said base portion of said lever further comprising a wedge shape within which are formed said notches.

10. The mechanism of claim 9, further comprising said pair of plungers being arrayed in a cross wise relationship relative to a direction of travel of said lever for selectively engaging said notches in said wedge shape.

11. A plunger lock mechanism, comprising:
a package defining housing supporting a pivotally adjustable lever;
a base portion of said lever exhibiting a plurality of notches;
a pair of plungers supported with said housing in opposing arrangement relative to said notches, said plungers each having a displaceable main body with a forward end engaging one of said notches, said plungers each having an angled leg which contacts a single eccentric profile of a rotatable cam;
first and second coil springs for biasing said first and second plungers in an engaged position relative to said lever;
an electric motor having a worm gear incorporated into said housing and engaging an outer keyed end of said cam in slaved relationship so that actuation of said motor causes rotation of said cam for actuating said plungers to linearly displace between either of engaged and disengaged positions relative said notches such that, when disengaged, permitting rotation of said lever; and
a magnet supported upon an end of said cam and, in response to rotation relative to a proximately located sensor, detecting a position of said cam.

12. The mechanism of claim 11, said housing further comprising right and left hand assemble-able portions defining a package receiving space therebetween.

13. The mechanism of claim 11, further comprising an outer keyed end of said cam including a worm driven gear in slaved relationship with said motor worm gear for rotation of said cam.

14. The mechanism of claim 11, said pair of plungers further comprising each of a first plunger in aligning relationship with Park and Neutral shifter locations and a second plunger in aligning relationship with Reverse and Drive positions associated with said lever.

15. The mechanism of claim 11, said base portion of said lever further comprising an arcuate end profile within which are formed said notches.

16. The mechanism of claim 15, further comprising said plungers being arrayed in a linear relationship relative to a direction of travel of said lever for selectively engaging said notches in said arcuate end profile.

17. The mechanism of claim 11, said base portion of said lever further comprising a wedge shape within which are formed said notches.

18. The mechanism of claim 17, further comprising said plungers being arrayed in a cross wise relationship relative to a direction of travel of said lever for selectively engaging said notches in said wedge shape.

* * * * *